United States Patent
VanBuskirk et al.

(10) Patent No.: US 11,605,043 B2
(45) Date of Patent: Mar. 14, 2023

(54) CONFIGURING, DEPLOYING, AND OPERATING AN APPLICATION FOR BUY-ONLINE-PICKUP-IN-STORE (BOPIS) PROCESSES, ACTIONS AND ANALYTICS

(71) Applicant: Theatro Labs, Inc., Richardson, TX (US)

(72) Inventors: Guy R. VanBuskirk, Grapevine, TX (US); Christopher N. Todd, Dallas, TX (US); Ravi Shankar Kumar, Richardson, TX (US); Kathryn Payne Torrence Shae, Dallas, TX (US); Jesse Alan Montgomery, Rowlett, TX (US)

(73) Assignee: Theatro Labs, Inc., Richardson, TX (US)

( * ) Notice: Subject to any disclaimer, the term of this patent is extended or adjusted under 35 U.S.C. 154(b) by 0 days.

(21) Appl. No.: 17/371,448

(22) Filed: Jul. 9, 2021

(65) Prior Publication Data

US 2021/0334732 A1 Oct. 28, 2021

Related U.S. Application Data

(63) Continuation-in-part of application No. 16/786,021, filed on Feb. 10, 2020, now Pat. No. 11,257,021, (Continued)

(51) Int. Cl.
G06Q 10/06 (2012.01)
G06Q 10/0639 (2023.01)
(Continued)

(52) U.S. Cl.
CPC ..... *G06Q 10/06398* (2013.01); *G06Q 10/087* (2013.01); *H04L 12/4625* (2013.01);
(Continued)

(58) Field of Classification Search
None
See application file for complete search history.

(56) References Cited

U.S. PATENT DOCUMENTS 5,712,899 A 1/1998 Pace
6,301,573 B1 10/2001 McIlwaine et al.
(Continued)

FOREIGN PATENT DOCUMENTS

EP 2679041 B1 11/2018
WO 0210926 A1 2/2002

OTHER PUBLICATIONS

Supplementary European Search Report, Application No. 12748969.8, dated Dec. 15, 2016, 7 pages.
(Continued)

*Primary Examiner* — Lashonda Jacobs-Burton

(57) ABSTRACT

In a method of observation platform buy-online-pickup-in-store (BOPIS) integration, a BOPIS application is provisioned at an observation platform. The provisioning is administered by a cloud services platform in collaboration with a computer system of the observation platform and includes configuration and deployment of the BOPIS application within the observation platform. An automation software component is sent from the BOPIS application for resident installation at an external retailer system which is external to an environment of the observation platform. The automation software component organizes information in the external retailer system for exchange, via a cloud-based gateway, with the BOPIS application. A message regarding a BOPIS order populated in the external retailer system is received at the BOPIS application from the external retailer system. The observation platform sends, to a device of a user of the observation platform, a task request to perform a task related to the message.

20 Claims, 13 Drawing Sheets

Related U.S. Application Data which is a continuation of application No. 16/195,555, filed on Nov. 19, 2018, now Pat. No. 10,558,938, which is a continuation of application No. 15/470,235, filed on Mar. 27, 2017, now Pat. No. 10,134,001, which is a continuation-in-part of application No. 14/869,167, filed on Sep. 29, 2015, now Pat. No. 10,069,781, and a continuation-in-part of application No. 15/375,725, filed on Dec. 12, 2016, now Pat. No. 9,928,529, which is a continuation of application No. 14/320,356, filed on Jun. 30, 2014, now Pat. No. 9,542,695, which is a continuation-in-part of application No. 13/401,146, filed on Feb. 21, 2012, now Pat. No. 8,948,730, said application No. 14/320,356 is a continuation-in-part of application No. 13/665,527, filed on Oct. 31, 2012, now abandoned, said application No. 15/375,725 is a continuation-in-part of application No. 13/665,527, filed on Oct. 31, 2012, now abandoned.

(60) Provisional application No. 62/314,106, filed on Mar. 28, 2016, provisional application No. 61/445,504, filed on Feb. 22, 2011, provisional application No. 61/487,432, filed on May 18, 2011.

(51) Int. Cl.

| | | |
|---|---|---|
| *H04L 67/12* | (2022.01) | |
| *H04L 67/306* | (2022.01) | |
| *H04L 12/46* | (2006.01) | |
| *H04L 51/18* | (2022.01) | |
| *H04L 67/50* | (2022.01) | |
| *H04L 67/02* | (2022.01) | |
| *G06Q 10/087* | (2023.01) | |
| *G06Q 30/0601* | (2023.01) | |

(52) U.S. Cl.
CPC .............. *H04L 51/18* (2013.01); *H04L 67/02* (2013.01); *H04L 67/12* (2013.01); *H04L 67/306* (2013.01); *H04L 67/535* (2022.05); *G06Q 30/0601* (2013.01); *G06Q 30/0635* (2013.01)

(56) References Cited

U.S. PATENT DOCUMENTS

| | | | |
|---|---|---|---|
| 6,377,927 B1 | 4/2002 | Loghmani et al. | |
| 6,618,734 B1 | 9/2003 | Williams et al. | |
| 6,928,343 B2 | 8/2005 | Cato | |
| 6,937,988 B1 | 8/2005 | Hemkumar et al. | |
| 6,937,998 B1 | 8/2005 | McGlynn et al. | |
| 6,996,531 B2 | 2/2006 | Korall et al. | |
| 7,058,208 B2 | 6/2006 | Chang et al. | |
| 7,248,881 B2 | 7/2007 | Shostak | |
| 7,397,368 B2 | 7/2008 | Otto et al. | |
| 7,640,511 B1 | 12/2009 | Keel et al. | |
| 7,656,295 B2 | 2/2010 | Robson et al. | |
| 7,748,618 B2 | 7/2010 | Vawter | |
| 7,925,777 B2 | 4/2011 | Levett | |
| 8,055,296 B1 | 11/2011 | Persson et al. | |
| 8,060,412 B2 | 11/2011 | Rosenbaum et al. | |
| 8,140,340 B2 | 3/2012 | Bhogal et al. | |
| 8,174,359 B1 | 5/2012 | Veni | |
| 8,179,872 B2 | 5/2012 | Bienfait et al. | |
| 8,180,377 B2 | 5/2012 | Yang et al. | |
| 8,183,996 B2 | 5/2012 | Toyokawa et al. | |
| 8,200,480 B2 | 6/2012 | Shectman et al. | |
| 8,271,188 B2 | 9/2012 | De Koning | |
| 8,352,260 B2 | 1/2013 | Sung et al. | |
| 8,369,505 B2 | 2/2013 | Vuong | |
| 8,392,262 B2* | 3/2013 | Mallick ............. | G06Q 30/0601 705/26.1 |
| 8,473,289 B2 | 6/2013 | Jitkoff et al. | |
| 8,630,851 B1 | 1/2014 | Hertschuh et al. | |
| 8,699,694 B2 | 4/2014 | Chishti et al. | |
| 8,798,036 B2 | 8/2014 | Kūt et al. | |
| 8,948,730 B2 | 2/2015 | VanBuskirk et al. | |
| 9,042,921 B2 | 5/2015 | Karmarkar | |
| 9,053,449 B2 | 6/2015 | Kumar et al. | |
| 9,060,050 B1 | 6/2015 | Chau et al. | |
| 9,195,959 B1* | 11/2015 | Lopez ............... | G06Q 30/0635 |
| 9,271,118 B2 | 2/2016 | VanBuskirk et al. | |
| 9,305,554 B2 | 4/2016 | Jagatheesan et al. | |
| 9,311,466 B2 | 4/2016 | Headley | |
| 9,349,128 B1 | 5/2016 | Kerr et al. | |
| 9,407,543 B2 | 8/2016 | Russell et al. | |
| 9,414,195 B2 | 8/2016 | Russell et al. | |
| 9,445,232 B2 | 9/2016 | Russell et al. | |
| 9,501,951 B2 | 11/2016 | Russell | |
| 9,514,656 B2 | 12/2016 | Russell | |
| 9,542,695 B2 | 1/2017 | Russell | |
| 9,602,625 B2 | 3/2017 | Russell et al. | |
| 9,665,899 B1* | 5/2017 | Nair ................... | G06Q 30/0639 |
| 9,686,732 B2 | 6/2017 | Russell et al. | |
| 9,691,047 B2 | 6/2017 | Russell et al. | |
| 9,721,285 B2* | 8/2017 | Jones ................ | G06Q 30/0617 |
| 9,928,529 B2 | 3/2018 | Russell et al. | |
| 9,971,983 B2 | 5/2018 | Russell et al. | |
| 9,971,984 B2 | 5/2018 | Russell et al. | |
| 10,069,781 B2 | 9/2018 | Kumar et al. | |
| 10,134,001 B2 | 11/2018 | Todd et al. | |
| 10,204,524 B2 | 2/2019 | Russell et al. | |
| 10,257,085 B2 | 4/2019 | Russel et al. | |
| 10,304,094 B2 | 5/2019 | Russell et al. | |
| 10,313,289 B2 | 6/2019 | Kumar et al. | |
| 10,375,133 B2 | 8/2019 | VanBuskirk et al. | |
| 10,558,938 B2 | 2/2020 | Todd et al. | |
| 10,574,784 B2 | 2/2020 | Russell et al. | |
| 10,699,313 B2 | 6/2020 | Russell et al. | |
| 11,037,184 B2* | 6/2021 | Li ....................... | G06Q 30/0239 |
| 11,038,982 B2 | 6/2021 | Russell et al. | |
| 11,257,021 B2 | 2/2022 | Todd et al. | |
| 11,283,848 B2 | 3/2022 | VanBuskirk et al. | |
| 11,410,104 B2* | 8/2022 | Todd .................. | G06Q 10/0633 |
| 2002/0055866 A1 | 5/2002 | Dewar | |
| 2002/0072984 A1* | 6/2002 | Rothman ........... | G06Q 30/0625 705/26.81 |
| 2002/0136383 A1 | 9/2002 | Contreras | |
| 2002/0143548 A1 | 10/2002 | Korall et al. | |
| 2003/0065805 A1 | 4/2003 | Barnes | |
| 2003/0130893 A1 | 7/2003 | Farmer | |
| 2003/0236086 A1 | 12/2003 | Litwin | |
| 2004/0203989 A1 | 10/2004 | Karaoguz | |
| 2005/0021838 A1 | 1/2005 | Levett | |
| 2005/0060236 A1 | 3/2005 | Iulo | |
| 2005/0190772 A1 | 9/2005 | Tsai et al. | |
| 2005/0213518 A1 | 9/2005 | Ahya et al. | |
| 2005/0221264 A1 | 10/2005 | Hearn et al. | |
| 2005/0245232 A1 | 11/2005 | Jakober et al. | |
| 2006/0071775 A1 | 4/2006 | Otto et al. | |
| 2006/0095317 A1 | 5/2006 | Brown et al. | |
| 2006/0248011 A1 | 11/2006 | Hecht-Nielsen et al. | |
| 2007/0046458 A1 | 3/2007 | Toyokawa et al. | |
| 2007/0064913 A1 | 3/2007 | Shaffer et al. | |
| 2007/0129061 A1 | 6/2007 | Ringland et al. | |
| 2007/0207789 A1 | 9/2007 | Zellner et al. | |
| 2007/0223662 A1 | 9/2007 | Jain et al. | |
| 2008/0040431 A1 | 2/2008 | Bleeker et al. | |
| 2008/0041937 A1 | 2/2008 | Vawter | |
| 2008/0154612 A1 | 6/2008 | Evermann et al. | |
| 2008/0159271 A1 | 7/2008 | Kutt et al. | |
| 2008/0240384 A1 | 10/2008 | Suryanarayana et al. | |
| 2008/0242319 A1 | 10/2008 | Paschetto et al. | |
| 2008/0270249 A1 | 10/2008 | Rosenbaum et al. | |
| 2008/0279133 A1 | 11/2008 | Bienfait et al. | |
| 2009/0003309 A1 | 1/2009 | Bawcutt et al. | |
| 2009/0005972 A1 | 1/2009 | De Koning | |
| 2009/0012793 A1 | 1/2009 | Dao et al. | |
| 2009/0176510 A1 | 7/2009 | Routtenberg | |
| 2009/0234655 A1 | 9/2009 | Kwon | |
| 2009/0249432 A1 | 10/2009 | O'Sullivan et al. | |

(56) References Cited

U.S. PATENT DOCUMENTS

| | | |
|---|---|---|
| 2009/0254667 A1 | 10/2009 | Li et al. |
| 2010/0003659 A1 | 1/2010 | Edmonds |
| 2010/0009698 A1 | 1/2010 | Yang et al. |
| 2010/0054526 A1 | 3/2010 | Eckles |
| 2010/0070268 A1 | 3/2010 | Sung et al. |
| 2010/0088749 A1 | 4/2010 | Steeples |
| 2010/0094707 A1 | 4/2010 | Freer |
| 2010/0113062 A1 | 5/2010 | Lee et al. |
| 2010/0266994 A1 | 10/2010 | Gregoire et al. |
| 2010/0325207 A1 | 12/2010 | Churchill et al. |
| 2011/0022642 A1 | 1/2011 | Demilo et al. |
| 2011/0055207 A1 | 3/2011 | Schorzman et al. |
| 2011/0072154 A1 | 3/2011 | Bogdanovic et al. |
| 2011/0077989 A1 | 3/2011 | Akred et al. |
| 2011/0093818 A1 | 4/2011 | Sathish |
| 2011/0171935 A1 | 7/2011 | Kamal |
| 2011/0173041 A1* | 7/2011 | Breitenbach ........... B67D 7/348 |
| | | 705/26.1 |
| 2011/0179180 A1 | 7/2011 | Schleifer et al. |
| 2011/0201356 A1 | 8/2011 | George et al. |
| 2011/0202466 A1 | 8/2011 | Carter |
| 2011/0205053 A1 | 8/2011 | Chen et al. |
| 2011/0237217 A1 | 9/2011 | Monks et al. |
| 2011/0255680 A1 | 10/2011 | Vuong |
| 2012/0034590 A1 | 2/2012 | Hallsten et al. |
| 2012/0071129 A1 | 3/2012 | Haney |
| 2012/0089617 A1 | 4/2012 | Frey |
| 2012/0123890 A1 | 5/2012 | Nathan |
| 2012/0151380 A1 | 6/2012 | Bishop |
| 2012/0226757 A1 | 9/2012 | McFarland et al. |
| 2012/0258437 A1 | 10/2012 | Sadeh-Koniecpol et al. |
| 2012/0310980 A1 | 12/2012 | Hepper |
| 2013/0040600 A1 | 2/2013 | Reitnour et al. |
| 2013/0060568 A1* | 3/2013 | Russell ................... G06Q 10/00 |
| | | 704/235 |
| 2013/0073388 A1 | 3/2013 | Heath |
| 2013/0117824 A1 | 5/2013 | Naslund et al. |
| 2013/0130207 A1 | 5/2013 | Russell et al. |
| 2013/0196706 A1 | 8/2013 | Patel et al. |
| 2013/0196906 A1 | 8/2013 | Eliasof |
| 2013/0204972 A1 | 8/2013 | Russell et al. |
| 2013/0204998 A1 | 8/2013 | Russell et al. |
| 2013/0317944 A1 | 11/2013 | Huang et al. |
| 2014/0026094 A1 | 1/2014 | Zimmerman et al. |
| 2014/0052676 A1 | 2/2014 | Wagner et al. |
| 2014/0143354 A1 | 5/2014 | Tiernan |
| 2014/0148210 A1 | 5/2014 | Kundu et al. |
| 2014/0214979 A1 | 7/2014 | Turakhia |
| 2014/0279238 A1* | 9/2014 | Jones ................. G06Q 30/0617 |
| | | 705/26.43 |
| 2014/0316779 A1 | 10/2014 | Russell et al. |
| 2014/0316898 A1 | 10/2014 | Russell et al. |
| 2015/0065149 A1 | 3/2015 | Russell et al. |
| 2015/0100433 A1* | 4/2015 | Choy ................. G06Q 30/0635 |
| | | 705/26.81 |
| 2015/0105061 A1 | 4/2015 | Russell et al. |
| 2015/0106167 A1 | 4/2015 | Russell et al. |
| 2015/0113098 A1 | 4/2015 | VanBuskirk et al. |
| 2015/0213382 A1* | 7/2015 | Russell ................. H04L 67/535 |
| | | 705/7.38 |
| 2015/0256873 A1 | 9/2015 | Klein et al. |
| 2015/0269700 A1 | 9/2015 | Miasnik et al. |
| 2015/0269869 A1 | 9/2015 | Russell et al. |
| 2015/0310536 A1* | 10/2015 | Brady ................. G06Q 30/0635 |
| | | 705/26.5 |
| 2016/0012471 A1 | 1/2016 | Fisher et al. |
| 2016/0014583 A1 | 1/2016 | Thomaschima et al. |
| 2016/0148300 A1* | 5/2016 | Carr ................... G06Q 30/0633 |
| | | 705/26.8 |
| 2016/0171432 A1 | 6/2016 | Pugh et al. |
| 2016/0225045 A1 | 8/2016 | Cumberland et al. |
| 2016/0321595 A1 | 11/2016 | Russell et al. |
| 2016/0321596 A1 | 11/2016 | Russell et al. |
| 2016/0321611 A1 | 11/2016 | Russell et al. |
| 2016/0323181 A1 | 11/2016 | Russell et al. |
| 2016/0364790 A1 | 12/2016 | Lanpher et al. |
| 2017/0011449 A1 | 1/2017 | Mueller et al. |
| 2017/0024804 A1 | 1/2017 | Tepfenhart et al. |
| 2017/0039512 A1 | 2/2017 | Jones et al. |
| 2017/0091837 A1 | 3/2017 | Russell et al. |
| 2017/0093952 A1 | 3/2017 | Kumar et al. |
| 2017/0187826 A1 | 6/2017 | Russell et al. |
| 2017/0213178 A1* | 7/2017 | Todd ...................... H04L 67/12 |
| 2018/0013698 A1 | 1/2018 | Vendrow et al. |
| 2018/0144356 A1 | 5/2018 | Holman et al. |
| 2018/0189844 A1 | 7/2018 | Russell et al. |
| 2018/0191817 A1 | 7/2018 | Richardson et al. |
| 2018/0260758 A1 | 9/2018 | Russell et al. |
| 2018/0375810 A1 | 12/2018 | Kumar et al. |
| 2019/0130336 A1 | 5/2019 | Todd et al. |
| 2019/0156688 A1 | 5/2019 | Russell et al. |
| 2019/0207894 A1 | 7/2019 | Kumar et al. |
| 2019/0311409 A1 | 10/2019 | Russell et al. |
| 2019/0349412 A1 | 11/2019 | VanBuskirk et al. |
| 2020/0153729 A1 | 5/2020 | VanBuskirk et al. |
| 2020/0175454 A1 | 6/2020 | Todd et al. |
| 2020/0195750 A1 | 6/2020 | Russell et al. |
| 2020/0210927 A1 | 7/2020 | Russell et al. |
| 2020/0302493 A1 | 9/2020 | Russell et al. |
| 2021/0006610 A1 | 1/2021 | VanBuskirk et al. |
| 2021/0289042 A1 | 9/2021 | VanBuskirk et al. |
| 2021/0334730 A1 | 10/2021 | Todd et al. |
| 2021/0334731 A1 | 10/2021 | Todd et al. |
| 2021/0399981 A1 | 12/2021 | VanBuskirk et al. |
| 2022/0108259 A1 | 4/2022 | VanBuskirk et al. |
| 2022/0374949 A1 | 11/2022 | Russell et al. |

OTHER PUBLICATIONS

"European Search Report, Application No. 14160323.3", dated Jun. 18, 2014, 6 pages.

"International Search Report, PCT/2012/025984", dated Dec. 22, 2012, 9 pages.

"What is Cloud Networking or Cloud Based Networking?", SDxCentral, www.sdxcentral.com/cloud/definitions/all-about-cloud-networking/, 2017, 2 pgs.

Arbanowski, "I-centric Communications: Personalization, Ambient Awareness and Adaptability for Future Mobile Services", IEEE Communications Magazine, Sep. 2004, 7 pages.

Rao, "Geographic Routing without Location Information", 9th Annual International Conference on Mobile Computing and Networking, Sep. 2003, 13 pages.

* cited by examiner

400

```
┌─────────────────────────────────────────────────────────────┐
│ RESPONSIVE TO A REQUEST INTERACTION, SET UP, BY A COMPUTER  │
│ SYSTEM, AN ACTION REQUEST REGARDING A STRUCTURED            │
│ COMMUNICATION IN THE OBSERVATION PLATFORM                   │
│ 410                                                         │
└─────────────────────────────────────────────────────────────┘
                              ▼
┌─────────────────────────────────────────────────────────────┐
│ ANALYZE, BY A COMPUTER SYSTEM, THE ACTION REQUEST WITH      │
│ RESPECT TO A PROGRAMMABLE POLICY OF THE OBSERVATION         │
│ PLATFORM AND APPLICATIONS INSTALLED ON THE OBSERVATION      │
│ PLATFORM                                                    │
│ 420                                                         │
└─────────────────────────────────────────────────────────────┘
                              ▼
┌─────────────────────────────────────────────────────────────┐
│ ANALYZE, BY THE COMPUTER SYSTEM, THE ACTION REQUEST WITH    │
│ RESPECT TO CONTEXT IN THE OBSERVATION PLATFORM, WHERE THE   │
│ CONTEXT IS ONE OF USER CONTEXT IN THE OBSERVATION PLATFORM  │
│ AND DEVICE CONTEXT IN THE OBSERVATION PLATFORM              │
│ 430                                                         │
└─────────────────────────────────────────────────────────────┘
                              ▼
┌─────────────────────────────────────────────────────────────┐
│ ANALYZE, BY THE COMPUTER SYSTEM, THE ACTION REQUEST WITH    │
│ RESPECT TO STATUS IN THE OBSERVATION PLATFORM, WHERE THE    │
│ STATUS IS ONE OF USER STATUS IN THE OBSERVATION PLATFORM    │
│ AND DEVICE STATUS IN THE OBSERVATION PLATFORM               │
│ 440                                                         │
└─────────────────────────────────────────────────────────────┘
                              ▼
┌─────────────────────────────────────────────────────────────┐
│ MODERATE, BY THE COMPUTER SYSTEM, AN ACTION IN THE          │
│ OBSERVATION PLATFORM WITH RESPECT TO THE STRUCTURED         │
│ COMMUNICATION BASED ON RESULTS OF THE POLICY, CONTEXT,      │
│ AND STATUS ANALYSES                                         │
│ 450                                                         │
└─────────────────────────────────────────────────────────────┘
```

FIG. 4A

400 Continued              (450)
                                 ▼
```
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ COLLECT, BY THE COMPUTER SYSTEM, DATA FROM THE OBSERVATION  │
│ PLATFORM IN RELATION TO THE STRUCTURED COMMUNICATION,       │
│ WHEREIN THE COLLECTED DATA IS STORED FOR ONE OR MORE OF     │
│ ANALYSIS, USE IN MAKING POLICY DECISIONS, USE IN MAKING     │
│ CONTEXT DECISIONS, AND REPORTING                            │
│ 460                                                         │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

PROVISION, AT AN OBSERVATION PLATFORM, AN EMERGENCY MANAGEMENT AND RESPONSE APPLICATION, WHEREIN THE PROVISIONING IS ADMINISTERED BY A CLOUD SERVICES PLATFORM IN COLLABORATION WITH A COMPUTER SYSTEM OF THE OBSERVATION PLATFORM, AND WHEREIN THE PROVISIONING INCLUDES CONFIGURATION AND DEPLOYMENT OF THE EMERGENCY MANAGEMENT AND RESPONSE APPLICATION WITHIN THE OBSERVATION PLATFORM
510

↓

ESTABLISH, VIA A GATEWAY OF THE CLOUD SERVICES PLATFORM, A COMMUNICATIVE CONNECTION BETWEEN THE EMERGENCY MANAGEMENT AND RESPONSE APPLICATION AND A SYSTEM EXTERNAL TO THE OBSERVATION PLATFORM
520

↓

RESPONSIVE TO RECEIPT AT THE OBSERVATION PLATFORM OF A REPORT OF AN EMERGENCY, TRIGGER OPERATION OF THE EMERGENCY MANAGEMENT AND RESPONSE APPLICATION WITHIN THE OBSERVATION PLATFORM
530

↓

SEND, VIA THE EMERGENCY MANAGEMENT AND RESPONSE APPLICATION, EMERGENCY MANAGEMENT INFORMATION TO A GROUP OF USERS OF THE OBSERVATION PLATFORM, WHEREIN THE EMERGENCY MANAGEMENT INFORMATION INCLUDES AT LEAST ONE OF AN ALERT RELATED TO THE EMERGENCY AND INSTRUCTIONS RELATED TO THE EMERGENCY
540

ESCALATING, BY THE OBSERVATION PLATFORM, THE EMERGENCY MANAGEMENT INFORMATION TO A LARGER AUDIENCE BASED ON A TYPE OF THE EMERGENCY
550

TRACK, BY THE EMERGENCY MANAGEMENT AND RESPONSE APPLICATION, RESPONSES OF USERS OF THE GROUP OF USERS TO THE EMERGENCY MANAGEMENT INFORMATION
560

DETERMINING, BY THE EMERGENCY MANAGEMENT AND RESPONSE APPLICATION, BASED ON THE USER RESPONSES, A STATUS OF AN OVERALL EMERGENCY RESPONSE IN COMPARISON TO A DEFAULT EMERGENCY RESPONSE PLAN CONFIGURED INTO THE EMERGENCY MANAGEMENT AND RESPONSE APPLICATION AS PART OF AN ENTERPRISE POLICY ON THE OBSERVATION PLATFORM
570

GATHERING, FROM USERS OF THE GROUP OF USERS, PRIMARY DATA AND STATISTICS, WHEREIN THE PRIMARY DATA AND STATISTICS ARE SELECTED FROM A GROUP PRIMARY DATA AND STATISTICS CONSISTING OF: A TASK NAME; A TASK STATUS; A TIMESTAMP FOR WHEN A TASK WAS OFFERED; A TIMESTAMP FOR WHEN A TASK WAS ASSIGNED; A TIMESTAMP FOR WHEN A TASK WAS ACCEPTED; A TIMESTAMP FOR WHEN A TASK WAS UPDATED; A TIMESTAMP FOR WHEN A TASK WAS COMPLETED; LOCATION INFORMATION OF ONE OR MORE USERS OF THE GROUP OF USERS; AND AN INTERACTION BETWEEN USERS OF THE GROUP OF USERS
580

PROVISION, AT AN OBSERVATION PLATFORM, A COLLABORATION APPLICATION, WHEREIN THE PROVISIONING IS ADMINISTERED BY A CLOUD SERVICES PLATFORM IN COLLABORATION WITH A COMPUTER SYSTEM OF THE OBSERVATION PLATFORM, AND WHEREIN THE PROVISIONING INCLUDES CONFIGURATION AND DEPLOYMENT OF THE COLLABORATION APPLICATION WITHIN THE OBSERVATION PLATFORM
610

↓

SEND, FROM THE COLLABORATION APPLICATION ON THE OBSERVATION PLATFORM, AN AUTOMATION SOFTWARE COMPONENT FOR RESIDENT INSTALLATION AT AN EXTERNAL COLLABORATION APPLICATION, WHEREIN THE EXTERNAL COLLABORATION APPLICATION IS EXTERNAL TO THE ENVIRONMENT OF THE OBSERVATION PLATFORM, AND WHEREIN THE AUTOMATION SOFTWARE COMPONENT ORGANIZES INFORMATION IN THE EXTERNAL COLLABORATION APPLICATION FOR EXCHANGE, VIA A CLOUD-BASED GATEWAY, WITH THE COLLABORATION APPLICATION
620

↓

COMMUNICATIVELY COUPLE THE COLLABORATION APPLICATION, VIA THE CLOUD-BASED GATEWAY, WITH THE EXTERNAL COLLABORATION APPLICATION
630

↓

SYNCHRONIZE USER INFORMATION AND TASK INFORMATION BETWEEN THE COLLABORATION APPLICATION AND THE EXTERNAL COLLABORATION APPLICATION, WHEREIN AT LEAST A PORTION OF THE USER INFORMATION RECEIVED FROM THE EXTERNAL COLLABORATION APPLICATION IS PROVIDED BY THE AUTOMATION SOFTWARE COMPONENT
640

GATHER, BY THE OBSERVATION PLATFORM, DATA AND PRIMARY STATISTICS ASSOCIATED WITH ONE OR MORE OF USERS AND TASKS
650

PROVISION, AT AN OBSERVATION PLATFORM, A BUY-ONLINE-PICKUP-IN-STORE (BOPIS) APPLICATION, WHEREIN THE PROVISIONING IS ADMINISTERED BY A CLOUD SERVICES PLATFORM IN COLLABORATION WITH A COMPUTER SYSTEM OF THE OBSERVATION PLATFORM, AND WHEREIN THE PROVISIONING INCLUDES CONFIGURATION AND DEPLOYMENT OF THE BOPIS APPLICATION WITHIN THE OBSERVATION PLATFORM
710

↓

SEND, FROM THE BOPIS APPLICATION ON THE OBSERVATION PLATFORM, AN AUTOMATION SOFTWARE COMPONENT FOR RESIDENT INSTALLATION AT AN EXTERNAL RETAILER SYSTEM, WHEREIN THE EXTERNAL RETAILER SYSTEM IS EXTERNAL TO AN ENVIRONMENT OF THE OBSERVATION PLATFORM, AND WHEREIN THE AUTOMATION SOFTWARE COMPONENT ORGANIZES INFORMATION IN THE EXTERNAL RETAILER SYSTEM FOR EXCHANGE, VIA A CLOUD-BASED GATEWAY, WITH THE BOPIS APPLICATION
720

↓

RECEIVE, AT THE BOPIS APPLICATION FROM THE EXTERNAL RETAILER SYSTEM, A MESSAGE REGARDING A BOPIS ORDER POPULATED IN THE EXTERNAL SYSTEM
730

↓

SEND, BY THE OBSERVATION PLATFORM, A DEVICE OF A USER OF THE OBSERVATION PLATFORM A TASK REQUEST TO PERFORM A TASK RELATED TO THE MESSAGE REGARDING THE BOPIS ORDER
740

RECEIVE, AT THE OBSERVATION PLATFORM, A TASK ACCEPTANCE MESSAGE FROM THE DEVICE TO INDICATE ACCEPTANCE OF THE TASK BY THE USER, WHEREIN THE USER INITIATES THE TASK ACCEPTANCE MESSAGE VIA INTERACTION WITH THE DEVICE
750

RESPONSIVE TO RECEIPT OF THE TASK ACCEPTANCE MESSAGE, SUSPEND, BY THE OBSERVATION PLATFORM, OTHER TASK REQUESTS FROM BEING SENT TO THE DEVICE OF THE USER UNTIL A TASK COMPLETION MESSAGE IS RECEIVED FROM THE DEVICE TO INDICATE COMPLETION OF THE TASK BY THE USER
760

RECEIVE, AT THE OBSERVATION PLATFORM, A TASK COMPLETION MESSAGE FROM THE DEVICE TO INDICATE COMPLETION OF THE TASK BY THE USER, WHEREIN THE USER INITIATES THE TASK COMPLETION MESSAGE VIA INTERACTION WITH THE DEVICE
770

REPORT TO THE EXTERNAL RETAILER SYSTEM, VIA THE BOPIS APPLICATION OF THE OBSERVATION PLATFORM, COMPLETION OF THE TASK RELATED TO THE BOPIS MESSAGE
780

FIG. 7B

CONFIGURING, DEPLOYING, AND OPERATING AN APPLICATION FOR BUY-ONLINE-PICKUP-IN-STORE (BOPIS) PROCESSES, ACTIONS AND ANALYTICS

CROSS-REFERENCE TO RELATED U.S. APPLICATIONS—CONTINUATION-IN-PART

This application is a continuation-in-part of and claims the benefit of patent application, Ser. No. 16/786,021, now U.S. Pat. No. 11,257,021, entitled "OBSERVATION PLATFORM USING STRUCTURED COMMUNICATIONS FOR GENERATING, REPORTING AND CREATING A SHARED EMPLOYEE PERFORMANCE LIBRARY," by Christopher N. Todd et al., with filing date Feb. 10, 2020, which is herein incorporated by reference in its entirety.

Application Ser. No. 16/786,021 is a continuation of and claims the benefit of patent application, Ser. No. 16/195,555, now U.S. Pat. No. 10,558,938, entitled "OBSERVATION PLATFORM USING STRUCTURED COMMUNICATIONS FOR GENERATING, REPORTING AND CREATING A SHARED EMPLOYEE PERFORMANCE LIBRARY," by Christopher N. Todd et al., with filing date Nov. 19, 2018, which is herein incorporated by reference in its entirety.

Application Ser. No. 16/195,555 is a continuation of and claims the benefit of the patent application, Ser. No. 15/470,235, now U.S. Pat. No. 10,134,001, entitled "OBSERVATION PLATFORM USING STRUCTURED COMMUNICATIONS FOR GATHERING AND REPORTING EMPLOYEE PERFORMANCE INFORMATION," by Christopher N. Todd et al., with filing date Mar. 27, 2017, which is herein incorporated by reference in its entirety.

Application Ser. No. 15/470,235 claims priority to the provisional patent application, Ser. No. 62/314,106, entitled "OBSERVATION PLATFORM USING STRUCTURED COMMUNICATIONS FOR GENERATING, REPORTING AND CREATING A SHARED EMPLOYEE PERFORMANCE LIBRARY," with filing date Mar. 28, 2016, which is herein incorporated by reference in its entirety.

Application Ser. No. 15/470,235 is a continuation-in-part application of and claims the benefit of the patent application, Ser. No. 14/869,167, now U.S. Pat. No. 10,069,781, entitled "OBSERVATION PLATFORM USING STRUCTURED COMMUNICATIONS WITH EXTERNAL DEVICES AND SYSTEMS," with filing date Sep. 29, 2015, which is herein incorporated by reference in its entirety.

Application Ser. No. 15/470,235 is a continuation-in-part application of and claims the benefit of patent application, Ser. No. 15/375,725, now U.S. Pat. No. 9,928,529, entitled "OBSERVATION PLATFORM FOR PERFORMING STRUCTURED COMMUNICATIONS," with filing date Dec. 12, 2016, which is herein incorporated by reference in its entirety.

Application Ser. No. 15/375,725 is a continuation application of and claims the benefit of patent application, Ser. No. 14/320,356, now U.S. Pat. No. 9,542,695, entitled "OBSERVATION PLATFORM FOR PERFORMING STRUCTURED COMMUNICATIONS," with filing date Jun. 30, 2014, which is herein incorporated by reference in its entirety.

The application with Ser. No. 14/320,356 is a continuation-in-part application of and claims the benefit of patent application, Ser. No. 13/401,146, now U.S. Pat. No. 8,948,730, entitled "OBSERVATION PLATFORM FOR USING STRUCTURED COMMUNICATIONS," with filing date Feb. 21, 2012, which is herein incorporated by reference in its entirety.

The application with Ser. No. 13/401,146 claims priority to the provisional patent application, Ser. No. 61/445,504, entitled "ENABLING A RETAIL SALES/SERVICE PROVIDER TO INTERACT WITH ON-PREMISE CUSTOMERS," with filing date Feb. 22, 2011, which is herein incorporated by reference in its entirety.

The application with Ser. No. 13/401,146 also claims priority to the provisional patent application, Ser. No. 61/487,432, entitled "ACTIVITY COORDINATING ASSOCIATE'S AUTOMATIC SERVICE ASSISTANT," with filing date May 18, 2011, which is herein incorporated by reference in its entirety.

The application with Ser. No. 14/320,356 is a continuation-in-part application of and claims the benefit of patent application, Ser. No. 13/665,527, entitled "AUDIBLE COMMUNICATIONS FOR QUERIES WITH INFORMATION INDICATIVE OF GEOGRAPHIC POSITION," with filing date Oct. 31, 2012, which is herein incorporated by reference in its entirety.

The application with Ser. No. 15/375,725 is also a continuation-in-part application of and claims the benefit of patent application, Ser. No. 13/665,527, entitled "AUDIBLE COMMUNICATIONS FOR QUERIES WITH INFORMATION INDICATIVE OF GEOGRAPHIC POSITION," with filing date Oct. 31, 2012.

BACKGROUND

Retailers are under constant pressure to cut costs, improve margins, and increase floor traffic and customer satisfaction. This has always been so, but the rise of the internet, available at home and while mobile, has increased the pressure greatly. Loyalty programs and per-customer pricing, such as special discounts, are one set of tools used in the past, and used more today. Moreover, there is an increased demand to manage and train associates and provide an increased measure of customer satisfaction in a retail environment. The shift to online buying and services is also putting pressure on brand images as bricks-and-mortar business must have clear brand awareness to retain customers in the newly fluid environment. Such concerns also extend to situations and environments besides retail settings.

BRIEF DESCRIPTION OF THE DRAWINGS

FIGS. 4A-4B show a flow diagram illustrating the process flow for an example method of managing structured communications within an observation platform.

FIGS. 5A-5D show a flow diagram illustrating the process flow for an example method of managing emergency management information within an observation platform, according to various embodiments.

FIGS. 6A-6B show a flow diagram illustrating an example method of observation platform collaboration integration, according to various embodiments.

FIGS. 7A-7C show a flow diagram illustrating an example method of observation platform buy-online-pickup-in-store integration, according to various embodiments.

Figure 1A:
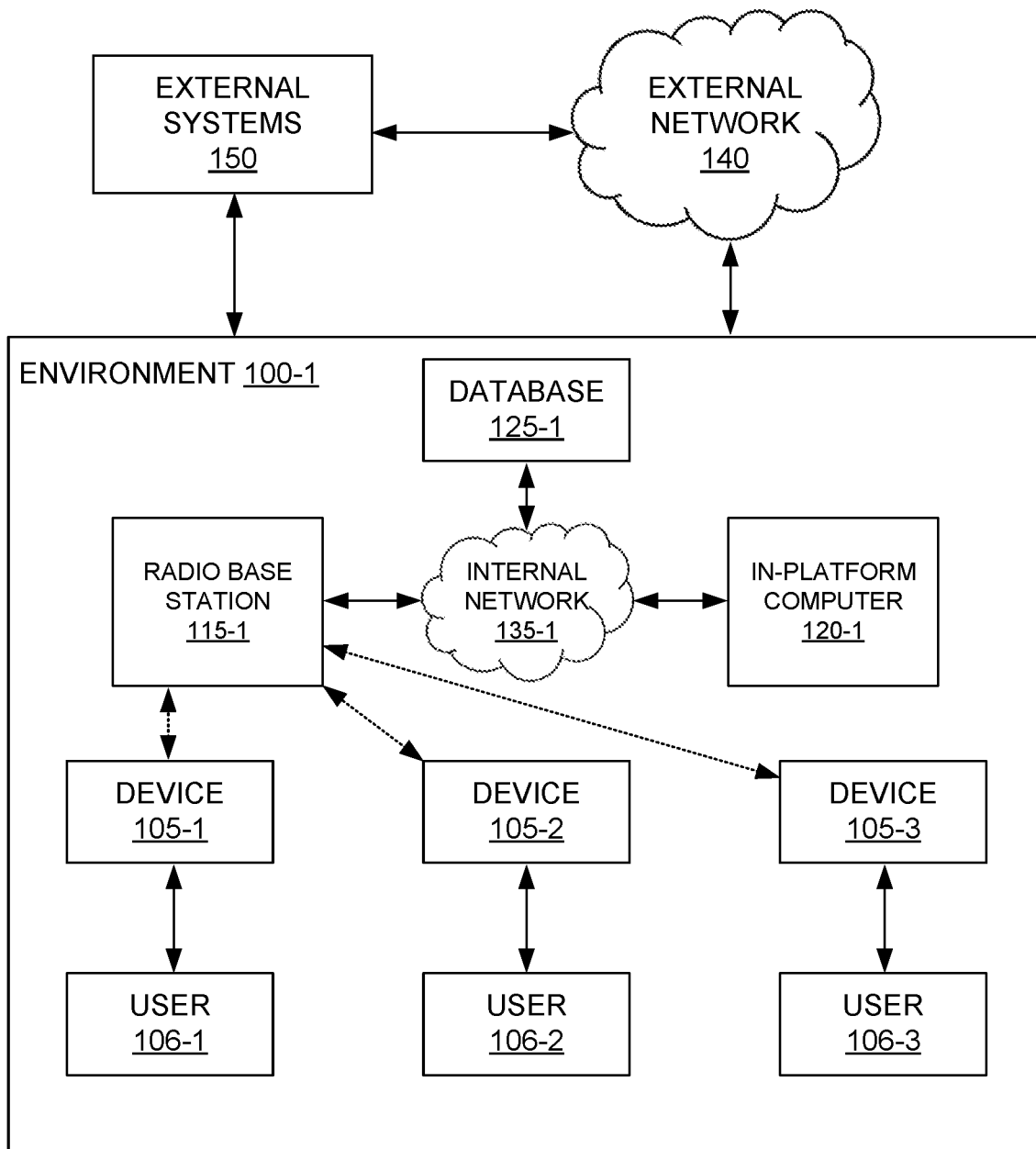
FIG. 1A illustrates a block diagram of an example environment for an observation platform for structuring a communication in accordance with embodiments of the present technology.

The drawings referred to in this description of embodiments should be understood as not being drawn to scale except if specifically noted.

DESCRIPTION OF EMBODIMENTS

The present technology provides structure to the communications and Internet of Things (IoT) connections so that the user community is more capable of performing their jobs and more consistent in representing the enterprise. The Observation Platform becomes the core of the connection and establishes the structure between people, groups, machines, IoT devices and external computer systems.

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications, and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "analyzing," "collecting," "communicating," "communicatively coupling," "controlling," "delaying," "delivering," "deriving," "detecting," "determining," "disabling," "enabling," "escalating," "establishing," "executing," "gathering," "generating," "identifying," "inhibiting," "interacting," "making," "moderating," "modifying," "providing," "provisioning," "receiving," "recognizing," "recording," "relaying," "remotely provisioning," "reporting," "responding," "scheduling," "sending," "selecting," "setting up," "specifying," "storing," "suspending," "synchronizing," "tracking," "triggering," or the like, refer to the actions and processes of a computer system, or similar electronic computing device. The computer system or similar electronic computing device, such as a wearable device, telephone, smart phone, tablet computer, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical, quantum and mechanical computers.

A user or users, as referred to herein, may be a person or people such as, sales associates, employees, managers, trainees, trainers, doctors, clinicians, patients, customers, cleaners, service personnel, emergency responders, hospitality personnel, etc. In one embodiment, the user interfaces with a device for communications with other users or interactions with external systems. Such a device may be a handheld device, a wearable device, a headset, a smartphone, a tablet, an IoT device, an earpiece, a radio, a computer system, or other device capable of providing communications across the network. Such users may be part of the enterprise operating the observation platform or they may be external to the operating entity (e.g., customers, shoppers or visitors) and desire access to users, information, alerts, alarms, or control of devices or external systems within the attached data network. Users may be identified directly via a screen-based application, via a spoken identification phrase, or via indirect identification using signals, behaviors and historical logs to infer the identity of the user. Some users may remain anonymous while they interact with the system.

Customers or visitors may refer to anyone within the environment of an observation platform who are not directly connected to the observation platform system but may do so by using the wearable devices or other applications (apps) designed to connect by permission and arrangement directly with the observation platform. In one embodiment, customers or visitors may refer to individuals who are purchasing or shopping for items or services in store or hospitality environment, past customers, potential customers, perspective customers, shoppers, browsers, or others who enter the store environment as a potential client and not with the same operational access an employee does.

In one embodiment, the computer system can determine geographic locations of users based on information received from communication devices associated with the users. The geographic location data may be stored as data associated with a user's device at a particular time, or as a performance metric, or may be combined with other information to generate a performance metric. The geographic information may also be used by managers to manage or train associates, or to improve customer service by assuring employees are in the optimal locations at a given time.

A performance metric may also be a metric, a key performance indicator (KPI), or a business metric. A metric or performance metric as referred to herein may be any type of data associated with or derived from a communication between users, including the location of the communications device, or the words spoken and the context of the device or user at the time of a particular communication event. In one embodiment, the computer system is able to generate a visual representation of metrics. For example, the visual representation may be a map of the geographic location of the users in an environment or may visually demonstrate the availability status of a user. In another example, the visual representation may be textual information such as the number of communications sent by a user or the length of time it took for a user to respond to a communication request or alarm. The performance metrics may be sent or displayed to a manager or other user for use in making decisions. The performance metrics may be used by the manager to improve and/or adjust customer service in a retail setting by taking actions such as reprimanding or rewarding an associate or noticing that no associates are located near a group of customers. Performance metrics may also generate real-time alarms or notifications that an action or coordination is needed.

The present technology provides for many examples of how an observation platform may be used in various environments for a variety of purposes. The systems, platforms, and methods may include some, or all of the hardware, software, applications, and firmware components discussed herein and in some embodiments may include alternative or additional hardware, software, applications, and firmware components.

Action Control and Data Aggregation using an Observation Platform

With reference now to FIG. 1A, a block diagram of a single observation platform showing environment 100-1 for enabling communications. Environment 100-1 includes devices 105 (105-1, 105-2, 105-3, etc.), radio base station 115-1, computer 120-1, database 125-1 and network 135-1 are illustrated environment 100-1 comprises components that may or may not be used with different embodiments of the present technology for an observation platform and should not be construed to limit the present technology. Each different device 105 is associated with its own different user 106. For example, device 105-1 is associated with user 106-1; device 105-2 is associated with user 106-2; and device 105-3 is associated with user 106-3. For purposes of brevity and clarity, only three devices 105 and their associated users 106 are illustrated. it should be appreciated that there may be greater or lesser numbers in an environment 101 of an observation platform. Some or all of the components of environment 100-1 may be described as an observation platform for structuring a communication. Reference to a retail setting is used for clarity in the descriptions and it is understood that the technology is not limited to a retail setting and could be applied in any enterprise or group environment where employees, visitors or people benefit from structured communication.

The present technology makes use of communication devices. Radio base station 115-1 and devices 105 may also be described as communication devices. Devices 105 may be user devices that are mobile and employed by a user to communicate with other users via other devices. Communications between the devices may be described as signals. One more of the devices 105 may be a wearable device, a smart phone, a personal digital assistant, a fob, a handheld device, a headset device or other small electronic device capable of wireless communication. In one embodiment, one or more or devices 105 employ speakers and/or microphones with one or more control buttons for audible communications. The control button(s) may be pressed to signal actions, push-to-talk buttons, volume control buttons, and power on/off buttons or other standard buttons and/or may be options on a touch screen. One or more of devices 105 may be handheld, may be worn around the neck, and may be a headset worn on the head or behind the ear or otherwise interface with the human body. One or more of devices 105 may or may not comprise a screen or display such as a liquid crystal display (LCD). In one embodiment, at lease one device 105 (e.g., 105-2) does not contain a display so that a user is not inundated with too many options or too much information from the device. A user device 105 without a display may simplify communications and thus allow heads-up awareness and presence in the environment. Another user, such as a customer or visitor, may be more likely to employ a specialized device if the human interface is simplified, or, alternatively, a smartphone device that they bring into environment 100-1.

Devices 105 and other devices may be brought into environment 100-1 by the user or issued by the enterprise hosting the observation platform. For example, in a retail setting, associates, employees, managers, and the like may be issued devices by the employer or owner of the retail setting. Customers in the retail setting may also be issued devices as they enter the retail setting, or they may use their personal smart devices to access the observation platform. Customers or visitors may choose whether or not to accept the device or whether or not to use the device after accepting it. The employee devices and the customer devices may or may not be the same type or model of devices. Alternatively, the customer or visitor may bring a device into the retail setting such as a smartphone. The customer may download an application to the smart phone that will allow the customer to use the device for communications in the observation platform in accordance with present technology. The customer may remain anonymous or may elect to identify themselves. In one embodiment, recognition of the customer's identity is not required for additional services or offers.

Radio base station 115-1 may be a communication device that is capable of communicating wirelessly with devices 105. Radio base station 115-1 may simply be a component of computer 120-1 or may be a standalone device that is coupled with, connected to, or otherwise associated with computer 120. Radio base station 115-1 and computer 120-1 may be physically adjacent to one another or may be separated by a distance (e.g., in a local server room or in a distant cloud services computing center). Computer 120-1 is able to receive communications from radio base station 115-1 and to send communications to radio base station 115-1 for radio base station 115-1 to transmit the communication to its destination. Some environments 100 may employ a plurality of radio base stations 115 as wireless access points that are networked and coupled to computer 120-1 in a manner that extends the coverage footprint versus using a single radio base station 115-1.

Computer 120-1 may be a desktop computer, a server computer, a cloud-based computer or other standard computing system or may be custom built for the present technology. Computer 120-1 is a computer system with a processor and memory and is capable of executing commands, software and firmware. Computer 120-1 provides the operating system, a portion of the memory, and the connectivity tools for linking to the radio base station via an internal network. Computer 120-1 may also connect to an external network 140 (e.g., a private network or the Internet) for the purpose of connecting to additional observation platforms or to connect to external cloud services for configuration control and/or software or application access. Computer 120 runs one or more applications that provide the end-user and management results.

Radio base station 115-1 and devices 105 employ standard techniques for communicating wirelessly. The communications may be performed using radio techniques such as near field communications, short wave radio, infrared, Bluetooth, Wi-Fi, cellular radio, 4G or 5G data communications, standard wireless computer network protocols, etc. In some embodiments, devices 105 are able to communicate with each other directly or through radio base station 115-1.

In some embodiments, within the observation platform environment 100-1, devices 105 communicate with each other via computer system 120-1. In one embodiment, for example, all communications in environment 100-1 are relayed through radio base station 115-1 and computer 120-1 which acts as a central hub. For example, device 105-1 may communicate with device 105-2 by device 105-1 sending a communication to radio base station 115-1, after which computer 120-1 interprets the communication and derives that device 105-2 is the destination for the communication and then relays the communication to device 105-2 via radio base station 115-1. This may occur automatically and quickly enough such that the users will not experience any undue lag in communications. In one embodiment, devices 105 may communicate directly with computer 120-1 (via radio base station 115-1) rather than with another device 105. For example, a user 106 associated with device 105-1 may issue a command to computer 120-1 via device 105-1, or computer 120-1 may send information to device 105-1. Information sent from computer 120-1 to device 105-1 may be an audible signal or may be visual, textual, contextual, geographical, or graphical data to be displayed at device 105-1 if it is properly equipped to do so. Computer 120-1 may extract data and information from the signals received by the radio base station 115-1.

In one embodiment, devices 105 may communicate with one another directly, and their signals may be monitored and processed by computer system 120-1 via a monitoring system associated with the radio base station 115-1. For example, radio base station 115-1 may monitor a transmission sent from device 105-1 to device 105-2. Instructions or commands may still be directed towards the computer system 120-1 and computer 120-1 may extract data and information from the direct signals.

In one embodiment, computer 120-1 is able to recognize a user sending a communication. The user may be recognized based on the device used to send the communication to computer 120-1 and radio base station 115. For example, device 105-1 may have a unique signature associated with its transmissions such that radio base station 115-1 or computer 120 can differentiate the device 105-1 from another device such as device 105-2 or device 105-3. In this manner, the user 106-1 of device 105-1 may be recognized by computer 120-1. Such recognition of a user (e.g., user 106-1) may then be employed by computer 120-1 for future communications with that device, with other devices, and/or for data collection (e.g., for attribution of collected data from a device 105 to a particular user associated with the device).

In one embodiment, the signal or communications between devices and/or computer systems are encrypted. The signal may be encoded such that it is unique to a specific device 105 (e.g., unique to device 105-1). The encryption or encoding may be employed by computer 120-1 to recognize the user of the device. In one embodiment, the user of a device 105 may identify himself to the computer system 120-1 and the computer system 120-1 makes the association between user identification and device 105's internal electronic identification (e.g., an identification of user 106-1 may be associated with device 105-1). Encryption may also be enabled to any external network connections such as external network 140.

Computer 120-1 may determine that the destination of a communication is a single device, a plurality of devices, or an external system. Thus computer 120-1 may relay a communication from device 105-1 only to device 105-2 or may relay it from device 105-1 to both device 105-2 and device 105-3. Computer 120-1 may determine that another user device is the destination of a communication originated by device 105-1 but may also directly respond to the communication by executing a command or sending a communication back to device 105-1. In one embodiment, a communication from a device 105 has more than one characteristic or aspect. For example, and with reference to device 105-1, the communication may have a first characteristic that corresponds to an audible source such the words spoken by user 106-1 employing device 105-1. The communication may additionally or alternatively have a second characteristic containing contextual information such as engaged, available, listening to information, returning to coverage zones, alarms, or other behavioral and/or contextual information. The communication may additionally or alternatively have a third characteristic that comprises geographical position information of device 105-1 or may have information indicative of a geographic position of device 105-1. Computer 120-1 may be able to determine a geographic position and direction of motion of a device 105 from the information indicative of a geographic position of the device 105. In one embodiment, computer 120-1 may receive location information from external systems and then match the location to a device 105 based on internal logic and policy. The motion of a device 105, as indicated by cumulated location information, may also be described as path of travel. A characteristic of the communication may be a portion of the communication, data associated with the communication, attributes of the communication, or metadata regarding the communication.

In one embodiment, computer 120-1 comprises a storage medium for storing some or all of the transactions. In some such embodiments, computer 120-1 may store some or all communications between devices in environment 100-1. Computer 120-1 may store communications for a predetermined amount of time and may move stored material to the cloud for additional processing or for long-term storage. Different characteristics of the communication may be stored including portions of the communication itself, button presses, responses to requests or alarms, or motions. Additionally, the computer may request and store all audible information regardless if the user presses a push-to-talk button or otherwise signals the need to begin a communication. For example, the communication may comprise an audible portion, a text portion, a context portion, information indicative of a geographical position, and a geographical data portion. The audible portion may also be converted to text. Computer 120-1 may store all or some of the different portions including the portion converted to text or machine-readable language. Computer 120-1 may store geographic position information regarding a device over a period of time such that a path of travel of the user may be inferred. Thus, the position and context of a user may be mapped, tracked or predicted through a physical environment or area.

In one embodiment, computer 120-1 receives a communication from a device with a portion of the communication that corresponds to a voice of the user of the device. Computer 120-1 is able to convert the audible portion to information used by computer 120-1 to derive context information from the communication to determine performance metrics regarding the communication or the behavior of the user of the device. The resulting information may also be interpreted as a command for computer 120-1 to execute depending on the policy or policies resident in computer 120-1 or the applications in operation at the time. The resulting information may also be employed to determine a destination for the communication, or alert, or the action required by the computer as a result of the application running and the interactions of the device.

In one embodiment, computer 120-1 executes a command received from a device 105-1. For example, the command may be directly received from a device such as device 105-1 or may be received in an audible voice signal which is converted to machine-readable language and then interpreted to be a command for computer 120-1. The command may be to initiate a virtual voice connection between two or more devices. For example, a command received from device 105-1 may be to initiate a virtual voice connection between device 105-1 and device 105-2. The command may be to initiate a connection to an external system to query, control or modify the operation of the external system. The command may be for computer 120-1 to store information into or extract information out of database 125-1. The command may generate an alert or an alarm that is distributed based on the application(s) running on computer 120-1.

In one embodiment, computer 120-1 is able to access database 125-1 over network 135-1. Network 135-1 may be a local area network, a wireless network, the Internet or another computer network. In one embodiment, database 125-1 is a component part of computer 120-1 and network 135-1 is not required for computer 120-1 to access database 125-1. Database 125-1 may comprise an inventory of product or any other type of information. For example, in a retail setting a customer may use a device to communicate with an associate regarding whether the retail setting has a particular product in stock. The associate may use key terms to query computer 120-1 regarding whether the product is in stock. Computer 120-1 may convert the associate's voice to text and recognize the command regarding whether the product is in stock. Computer 120-1 then queries database 125-1 and sends a response back to the associate and/or customer. The response may be sent back using an audible signal or a signal to be displayed on a screen at the user device. Similar examples may be constructed around product location databases, workforce scheduling systems, on-floor zone assignments, time clock systems, alarm and alert systems, or other information systems used for operations and reporting. Alternatively, computer 120-1 may recognize a command based on the converted text without a user saying key terms.

Database 125-1 may be a local inventory or a larger inventory. In one embodiment, database 125-1 is not an inventory system, but comprises different data. For example, a user may employ the device to communicate with and command computer 120-1 to perform a search of the Internet using a search engine. In another example, the user may employ the device to generate an alarm which is then processed by computer 120-1 in conjunction with the data in database 125-1 to alert the appropriate set of users and external systems. In another example, the database may be a knowledgebase of product, process or technical information. Database 125-1 may be further defined and structured depending on the application(s) running on computer 120-1.

Figure 1B:
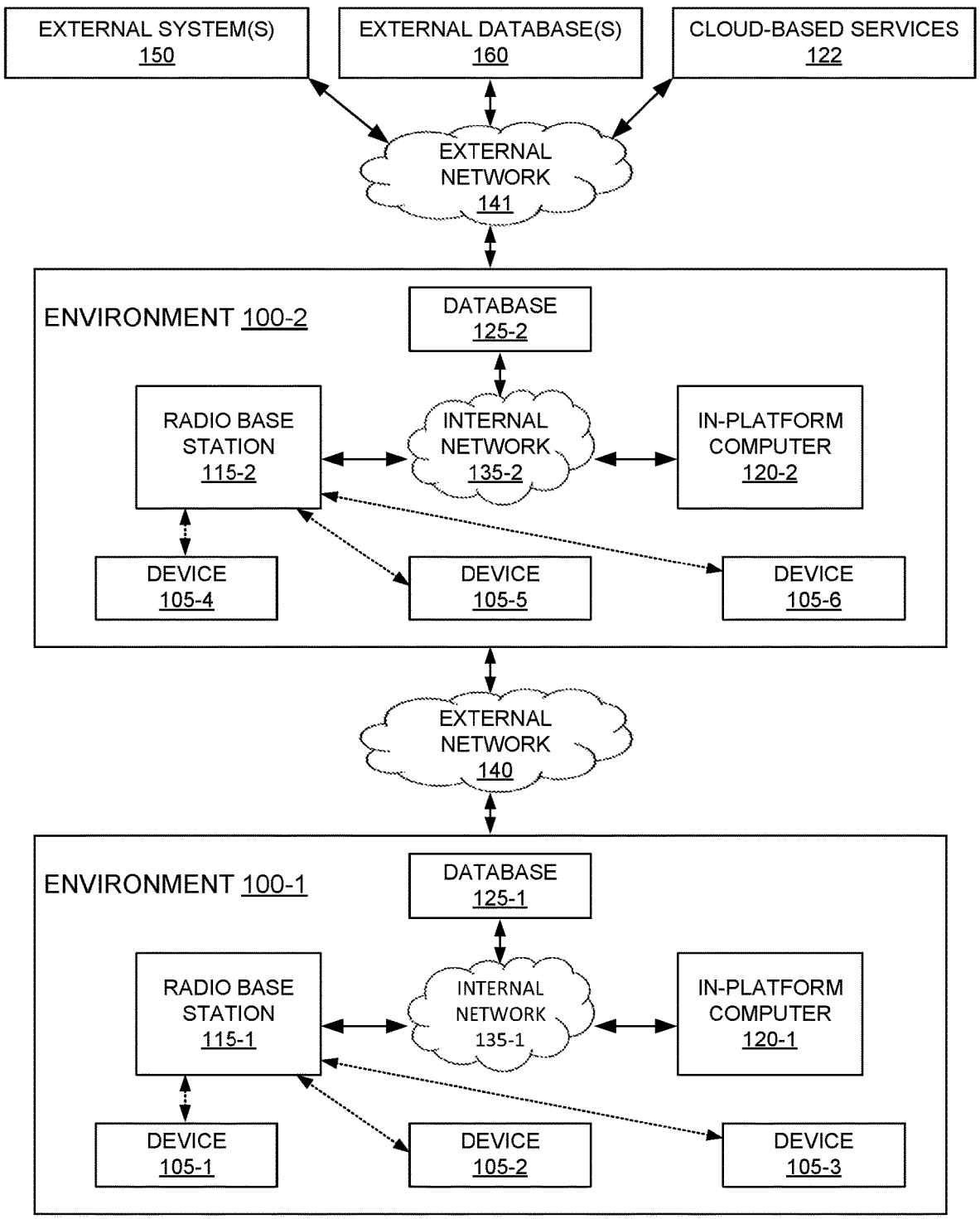
FIG. 1B illustrates a block diagram of an example environment for connecting observation platforms through external networks and for extending observation platforms to external systems

With reference now to FIG. 1B, a block diagram is illustrated of a first environment 100-1 plus a second environment 100-2 for structuring communications in an extended observation platform. Environment 100-2 is similar to environment 100-1 but includes devices 105-4, 105-5, and 105-6 along with radio base station 115-2, computer 120-2, database 125-2, and internal network 135-2. Environment 100-2 comprises components that may or may not be used with different embodiments of the present technology and should not be construed to limit the present technology. Some or all of the components of environment 100-2 may be described as an observation platform for structuring a communication.

As illustrated in FIG. 1B, in one embodiment, first environment 100-1 is communicatively coupled to second environment 100-2 through an external network 140. The components depicted in the combination of environment 100-1 and environment 100-2 may be described as a connected observation platform. Environment 100-1 may be described as having a radio range, or span of operating distance and environment 100-2 may be described as having a separate or different radio range. For example, radio base station 115-1 may have a physical limit regarding the distance which it may transmit radio signals. Therefore, a device outside of the radio range, such as devices 105-4, 105-5 and or 105-6 will not be able to communicate with computer 120-1 via a radio signal transmitted from radio base station 115-1. Additionally, one or more of devices 105 may also have a limited radio range for transmitting to a radio base station.

These limitations may be overcome by computer 120-1 of environment 100-1 relaying the communication to a second observation platform within environment 100-2 via external network 140. Therefore, devices 105-1 and 105-2 may communicate with either device 105-4 or 105-5 where the communications are relayed by computer 120-1, network 140 and computer 120-2 and then from radio base station 115-2 to/from devices 105-4 and/or 105-5. Environment 100-2 may be described as a second observation platform with components that are duplicates or similar to components of environment 100-1. Each of the environments 100-1 and 100-2 may comprises any number of communication devices 105 or other components such computers, routers, and transceivers. Thus, the present technology provides for structured or disciplined communications between at least two user devices 105 that may or may not be within radio range of one another or may not be within range of a common radio base station.

In one embodiment, an environment 100 such as environment 100-2 may be communicatively coupled to external systems through external network 141. The extension of environment 100-2 to external computer system(s) 150, external database(s) 160, and/or cloud-based services 122 comprises an extended observation platform. When environment 100-1 is also connected to either environment 100-2 or is itself coupled to external systems (e.g., 150, 160, 122), environment 100-1 also becomes an extended observation platform. Many observation platforms may be interconnected in this manner, and each observation platform may or may not connect to external systems. Multiple observation platforms can thus be interconnected, each with its own internal or external systems, and each running similar or different programmable policy, and each running similar or different applications. It is understood that observation platforms may be interconnected with various networking and transmission technologies and that external network 140 and external network 141 may be the same network, separate networks using similar technology, or separate networks using differing technologies.

In one embodiment, device 105-4 and/or environment 100-2 may be physically remote relative to radio base station 115-1 of environment 100-1. For example, all the components shown within environment 100-1 may be located within radio range of one another at a first location, but device 105-4 and environment 100-2 are located at a second location outside of the first location associated with environment 100-1. These first and second locations may be separated by any length of distance. The second location may be hundreds or even thousands of miles away from the first location or may be less than a mile away but still outside of environment 100-1. In one embodiment, computer 120-1 and radio base station 115-1 of environment 100-1 are located at a first physical address such as a street address for a building or other physical location, while device 105-2 is located at a second, different physical address along with computer 120-2 and radio base station 115-2.

In one embodiment, computer 120-1 and radio base station 115-1 are associated with a retail environment and environment 100-1 includes the retail floor as well as an office or other area designated for associates, managers, or employees of the retail environment. However, computer 120-2 and radio base station 115-2 are associated with environment 100-2 which is located at a second retail environment which is distinct from the first retail environment. The first and second retail environments may be related to one another such as both being a franchise of the same business or enterprise. Thus, a customer or associate may be located in environment 100-1 associated with a first franchise, e.g., a first observation platform, and speak with an associate using device 105-3 to a remote a second franchise, e.g., a second observation platform, such as environment 100-2 and device 105-5. The customer or associate may ask questions regarding the inventory of an item at the second franchise, speak with an associate at the second franchise that has knowledge not known by associates at the first franchise or connect to external systems if environment 100-2 is an extended observation platform.

Figure 2A:
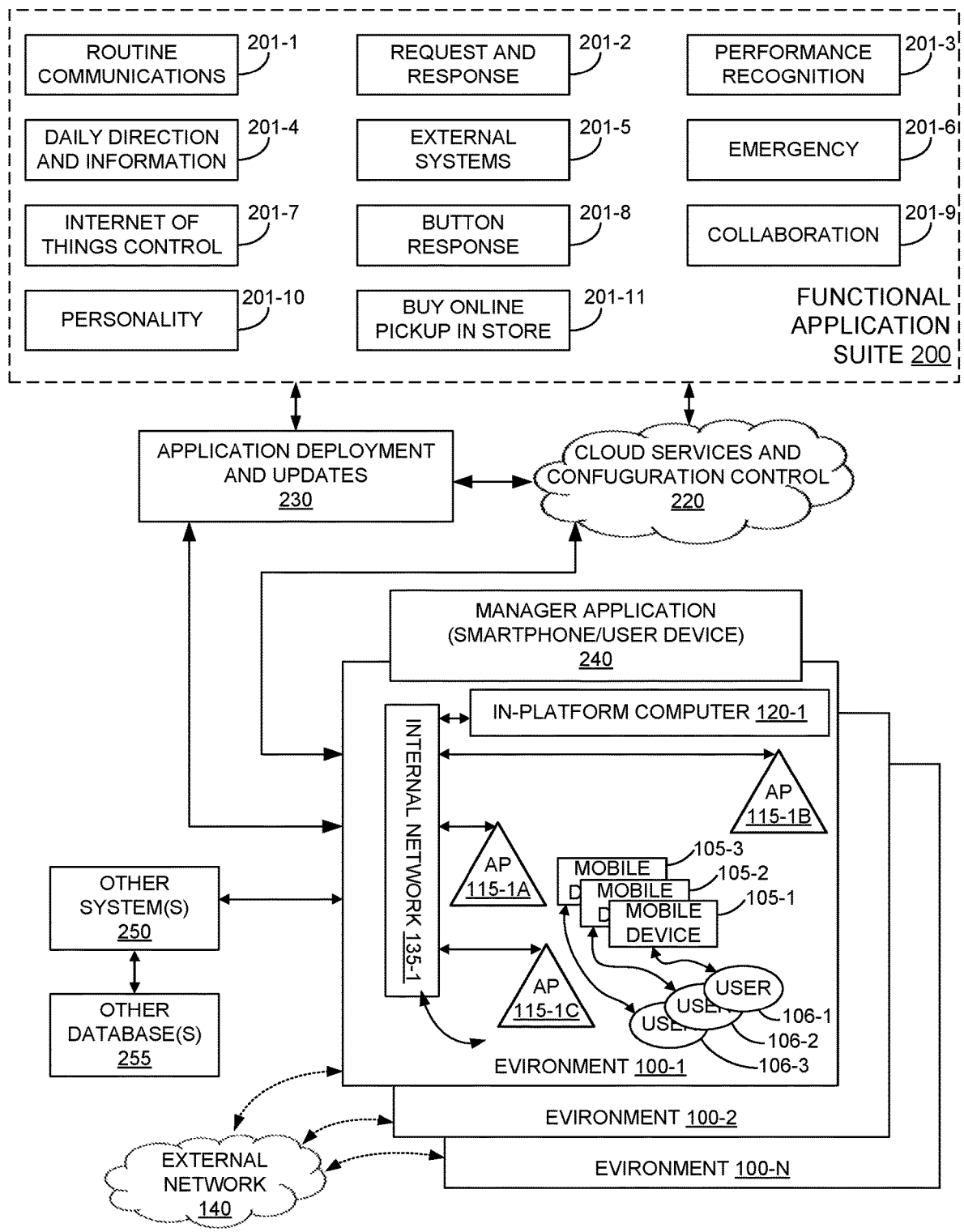
FIGS. 2A and 2B illustrate a block diagrams of an example environment for application deployment, configuration control, and updates within one or more observation platforms.

FIG. 2A shows an overview of example applications and how they relate to one or more observation platforms and their respective environments, according to various embodiments. In one embodiment, where environment 100-1 and environment 100-2 and other environments 100 (such as environment 100-N) each comprise separate observation platforms, the present technology is employed to manage and observe the observation platforms. In another embodiment where two or more of the environments 100 (e.g., 100-1, 100-2, and/or 100-N) are communicatively coupled via an external network 140 to form an extending observation platform, the present technology is employed to manage and observe the observation platforms. For example, applications suite 200 in FIG. 2A may be employed with the observation platforms and their environments and includes a plurality of remotely provisional functional applications. FIG. 2A illustrates a plurality of example functional applications 201 (routine communications application 201-1, request and response application 201-2, performance recognition application 201-3, daily direction and information application 201-4, external systems application 201-5, emergency application 201-6, internet-of-things control application 201-7, button response application 201-8, collaboration application 201-9, personality application 201-10, and buy online pickup in store (BOPIS) 201-11) in application suite 200, however some embodiments may include a greater or lesser number of applications 201 in an application suite 200. Each observation platform may run different applications and/or applications may be configured differently. These applications allow for the scalability of observation platforms such that a single user may have access to the data from a plurality of observation platforms and the ability to send messages to all or some of the devices associated with the observation platforms simultaneously or in a scheduled transmission. FIG. 2A differs from FIG. 2B only in that in FIG. 2A, computer environment 100-1 is depicted with an in-platform computer 120-1, whereas in FIG. 2B environment 100-1 is depicted with a cloud-based computer 120A-1 which is not in the same geographic vicinity as other aspects of environment 100-1. It should be appreciated that one or more observation platforms in an extended observation platform may utilize an in-platform computer 120 while one or more other observation platforms may utilize a cloud-based computer 120A.

Figure 2B:
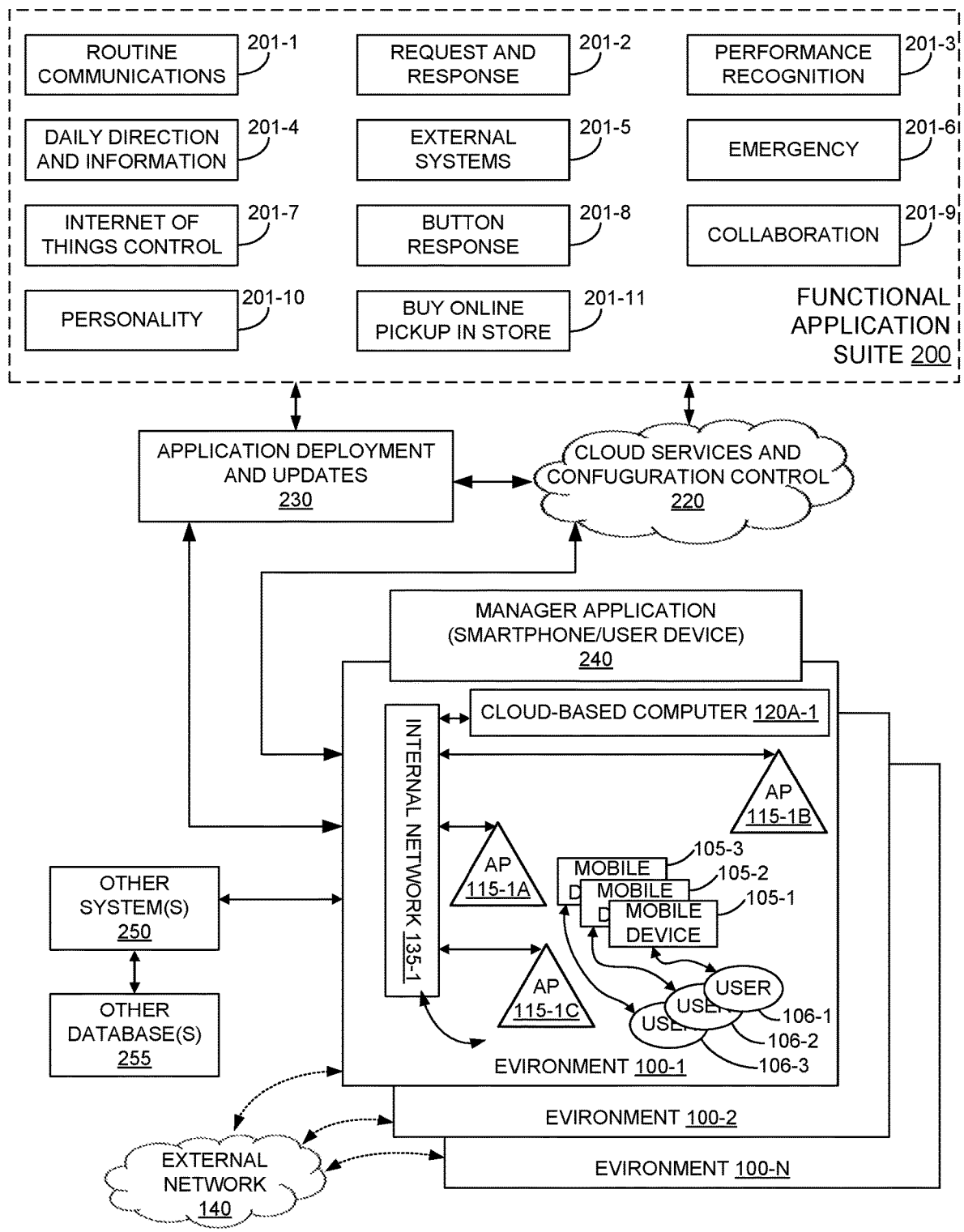

Functional application suite 200 provides a set of example applications that may be configured and run on an observation platform. The applications shown in FIGS. 2A and 2B are intended to provide examples of existing and planned applications and not intended to comprise a complete listing of possible applications.

In one embodiment, the routine communications application 201-1 may be downloaded and run to structure the communications between individuals, groups of users, and external systems. Routine communications includes the ability to create a private communications channel between individuals, a private communications channel between an individual and a group, a private communications channel between groups, private communications channel between an individual and other users in a given location, and a non-private broadcast communication to all users on one or more observation platforms.

In one embodiment, the request and response application 201-2 may be downloaded and run to structure the communications for a user or external system requesting an action or commitment. The application provides notification to a group of users that some action or commitment is required and then captures the response of a user who steps up to the task. Data and analytics measure the performance of the committed user in addition to all other users who heard the request, but perhaps did not respond.

In one embodiment, the performance recognition application 201-3 may be downloaded and run to structure the communications from a manager, supervisor, peer, or external system to an individual or group in recognition of either outstanding performance or sub-par performance. Data and analytics keep track of any "kudos" or corrections offered.

In one embodiment, the daily direction and information application 201-4 may be downloaded and run to structure the communications outbound from executives, managers, supervisors, or peers allowing all targeted personnel to receive information useful to their daily performance. Outbound information may be retained within the observation platform so that employees who later connect to the system can hear any relevant information. Data and analytics track the outbound information and when, where, and by whom it was received.

In one embodiment, the external systems application 201-5 may be downloaded and run to structure the communications between users and external systems such as inventory systems, IoT systems, camera/video systems, and alarm systems. The observation platform allows users to query external systems and allows external systems to communicate directly to users individually, in groups, in specific locations or in geographic areas. Data and analytics track interactions between users and external systems.

In one embodiment, the emergencies application 201-6 (also referred to as the "emergency management and response application") may be downloaded and run to structure the communications during an emergency within the enterprise. The emergency application 201-6 may provide directed actions to individuals, groups or specific locations, as well as track responses and share information throughout the extent of emergency.

In one embodiment, the internet of things (IoT) application 201-7 may be downloaded and run to structure the communications between IoT devices and users of the observation platform. Examples of IoT device interactions include lighting control, refrigeration control and alerting, door opening monitors, and timeclock verifications. There is a growing list of IoT devices, and IoT application 201-7 provides the interface between the user and the chosen IoT device.

In one embodiment, the button response application 201-8 may be downloaded and run to structure the communications from buttons, tablets, or other signaling devices so that users are informed and alerted to the action anticipated by a button press of an assigned button or by an alert signal. Button response often results in the form of a request and response action which may be handled by request and response application 201-2 and wrapped with information in the response which is helpful to the user. Data and analytics provide performance information for the system and users of the system.

In one embodiment, the collaboration application 201-9 may be downloaded and run to structure the communications between a remote collaboration application such as Microsoft Teams and the users of the observation platform. The collaboration application 201-9 integrates the functions of a third-party application such as task management or group participation into the normal modes of communication within the observation platform. Data and analytics are collected to verify performance and augment the data routinely collected by the third-party portion of collaboration application 201-9.

In one embodiment, the personality application 201-10 may be downloaded and run to structure the communications by giving differing types of communications a different personality. For example, an emergency application 201-6 may present a voice that is stern and decisive, while a performance recognition application 201-3 may present a voice that is warm and encouraging. By using the personality application 201-10 to control the sound of a voice, the user is more quickly aware of the type of information being presented and is more response to the urgency required.

In one embodiment, the buy-online-pickup-in-store (BOPIS) 201-11 may be downloaded and run to structure the communications between associates, store systems, and customers. The BOPIS application 2-1-11 may assist in picking and packing of orders, preparing for customer arrival, delivery to customer, and collection of feedback from customers. Data and analytics track the performance of each associate involved in the BOPIS operation as well as the performance of the entire pick and deliver process.

In one embodiment, user 106-1 of device 105-1 interfaces with computer 120-1 to use the present technology to manage, adjust, and/or facilitate communications. Computer 120-1 may determine and display performance metrics or visual representations regarding communications to the user of device 105. User 106-1 of device 105-1 may then use the performance metrics and visual representations to make decisions. For example, user 106-1 of device 105-1 may be a manager of associates who can identify that a customer has asked for assistance at a given location, but no associates have responded. The manager may then use the present technology to request an associated to assist the customer. In one embodiment, user 106-1 of device 105-1 is able to directly use computer 120-1 and radio base station 115-1 to communicate with other users of other devices 105 by individual identification, location groupings, expert groupings, role groupings, contextual groupings and/or communicate to external systems.

In one embodiment, computer 120-1 derives performance metrics, business metrics, or key performance indicators (KPIs) from the communications between users and/or systems. The metrics may be used to generate visual representations. The metrics and/or visual representations may be employed to make decisions or archived for later review and analysis. The metrics and visual representations may be sent to another computer system or device. A metric may be based on the behavior of a user, such as, the context of the user, information carried by the tone and quality of voice, and the user's spoken or signaled communications.

A sales performance metric may be determined by linking sales with users, measuring busy (or "engaged with shopper") times of users, and ascertaining busy status of user. The busy status of a user may indicate that the user is engaged in a communication, a task, assisting a customer or otherwise occupied. A response time metric may also be determined by measuring the time it takes to answer a user's question, or how long it takes to receive assistance after being asking for it. A customer satisfaction metric may also be derived based on the text of the customer's communication. A task performance metric may be determined by measuring the length of time an associate is currently engaged in performing said task, including noting pending and completed tasks. Metrics may be used by a manager to reward good behavior or correct undesired behavior. Additionally, because the communications and other audio information have been recorded, the communications may be used in training as examples. The applications running on each observation platform contain a set of data and primary statistics gathered by the observation platform used for further analysis by the observation platform computer or external systems.

Visual representations may be described as communication traffic intensity maps between users and/or groups such as who talks to whom, how frequently and at what time of day; who asks questions and who responds; who responds to tasks, when and how long it took to respond; and who has listened to which training segments, where they listened and when, who is responding to an alarm condition and how they are responding, who is not responding to an alarm condition and the elapsed time since the notification. Visual representations may also be described as location maps such as, a status of when users indicate that they are engaged, busy or available, when users ask questions; quiet areas where no communications or engagements are occurring; where users are not located; where selling tips were left and by whom; location-based-tasks and the times it takes to complete them; a path of where users have traveled geographically; and a map of the environment. With this observation platform for structuring communications, a more complete observation of many of the events in the interaction between and among all users can be observed, cataloged, stored and analyzed, providing a great deal of useful information to any manager of the overall process or useful to the economics of the enterprise.

Example Operation of an Observation Platform

An observation platform has a primary function of enabling communications and interconnections for users within a geographic region while providing structure and discipline for communications between users, groups and external computer systems. While mediating communications and interfacing with enterprise IT systems, an observation platform may also collects data and statistics from the users and systems; applying processes and procedures to the data to generate analytics; while using and adjusting programmable policy to determine the communications and interactions of external systems, the communication patterns between the users, and the behavior of the system relative to the words spoken or machine interactions. In one embodiment, the analytic outputs may be useful for measuring performance of users, groups (e.g., KPIs for task completion or responsiveness to a request), system adoption, system health, user behavior, relative user behavior, real time employee team behavior, generating alerts or alarms based on the data, responding to alerts or alarms based on the data, and monitoring the user reactions to the alerts or alarms. The analytic output may be used in real-time for directing actions, either programmatically or via human input, or may be cumulative for assessing efficiency, effectiveness and performance of uses, devices or connected systems.

Physically separated observation platforms can be interconnected via traditional networking services such as the Internet or may be connected via private networks or other networking technologies. Interconnected observation platforms are generally transparent to the user experience, although differing processes, policies and/or applications may be invoked at the individual platforms. Interconnection of observation platforms allows users to seamlessly interact with users or systems in different geographies. In one example, such transparent interconnection enables applications such as "expert groups" to seek out the best available talent from a pool of candidates in multiple geographic regions.

Decoding of spoken words through speech-to-text techniques enable the system to respond to verbal communications and/or commands and provides a human-to-machine interface to external systems. The observation platform responds to verbal commands, screen-based commands and controls, and external system inputs. The observation platform may have one or a multiple Application Programming Interfaces (APIs) or gateway functions that allow interconnection to external computer systems such as: IoT devices, paging systems, inventory databases, knowledgebases, call-button systems, Point-of-Sale (POS) systems, vendor specific databases, video analysis systems, door counters, training systems, time-clock systems, task management systems, telephone systems (e.g., Cisco Unified Contact Center Express Computer Telephony Integration (CTI)), asset tracking systems, collaboration platforms (e.g., Microsoft Teams, Cisco WebEX, Google Gsuite, or SLACK, etc.), emergency systems and other computer based systems residing locally, remotely via a network, or in the cloud.

Text-to-speech or direct conversion of computer information to human understandable speech allows the observation platform to respond to the users with information, directions, instruction, and collaboration histories. The observation platform may use differing audio sounds or speaker personalities to assist the user in identifying the type of information exchange in process. System personalities are invoked as method to distinguish for the user the context of the information being presented, or the type of information being requested.

The present technology may employ an architecture with cloud-based and site-based services that allow for the management of one or a plurality of observation platforms. Each environment may comprise any number of users associated with the observation platform including managers, associates, employees, hourly workers, salespeople, security forces, customers, guests, etc. A manager, a user, or an external system may employ the present technology to communicate with or collect data from the observation platform(s) or may use the present technology to hear, see, or deliver messages to the devices associated with the observation platform(s) and the users associated with devices. The messages may be live voice, voice recordings, text-to-speech (TTS) messages, or machine-to-speech messages, visual messages, or haptic messages. Messages may be sent by the user, triggered by the user, heard by the user, or generated by the computer based on device or user behavioral context and current policy.

An observation platform is a system comprised of computer systems and mobile devices that respond to speech commands and/or touch actions. The geography of a single observation platform is bounded by the useful service area of the wireless communication network connected to the relevant computer. A computer may be connected to the communications network within the geography, at a remote location, or in the cloud. Multiple observation platforms may be connected and act in harmony using longer range networking techniques such as fiber optics, cables, microwave links, or the Internet.

Each observation platform is comprised of one or more computer systems used to mediate communications and interactions. The computer 120 that operates the observation platform can run one or more applications (apps) from a library or suite of apps which are used to control the actions and characteristics of the system. Applications and programmable policy are used in combination to control who hears what or who creates what actions in remote systems. The result is that the observation platform provides a structure for communications and control for both the users and for the connected systems.

Using structuring communications in an observation platform, as referred to herein, may refer to the following actions regarding communications between two or more users: disciplining, structuring, controlling, participating, discouraging, encouraging, influencing, nudging, making an example of, permitting, inhibiting, enabling, managing, managing users and/or systems for compliance with policies, measuring what goes on as communication and motion occurs, characterizing, observing, recording, analyzing, correcting, directing, etc.

The structuring or disciplining process envisioned herein involves using communications and a computer system as a platform to detect commands, interpret those commands, respond to those commands; or interact with users to detect key words in messages, establish two-party and multi-party communications links, pass on messages, archive messages and commands, distribute information to target audiences, issue alerts or alarms, connect with and control external systems, respond to external systems, and relay or generate messages from external systems to target users. Simultaneously, the observation platform system derives data and analytics from interactions, motion and user context permitting an owner or manager to observe, analyze and document a user's or group's actions, interactions, human performance and system performance.

One purpose for structuring or disciplining communications and control is for the users to become better customer service agents and more effective salespeople such as in a retail setting. The present technology accomplishes this goal by monitoring communications, system interactions and physical activities of the users. The monitored information is used to derive context information from interactions such as the voluntary identity of the user, the current state or status of the user (e.g., busy, available, engaged, commanding, conversing, listening, being trained, out-of-range, not logged on, etc.), the role of a user (e.g., manager, associate, register operator, facilities worker, subject matter expert, security personnel, maintenance personnel, etc.). Context information may also be derived by physical characteristics of the device associated with a user such as, location, movement, voice loudness, speech cadence, voice intonations, background sounds, button press durations and counts.

Additional data may be added to the user context through business metrics such as the user's interaction with others, who and how often they interact, characterizations of their communications, user response to system suggestions or nudges, commands issued by the user, and interaction with external systems including responses, actions, productivity measurements, skill assessments, attitude evaluations, voice analysis, or other information relevant to making business and personnel decisions. Context information may be used to determine, for example, the role of the user, the skills of the user, the preferences of the user, or how the user behaves in groups or in the physical environment.

The structuring of communications and system actions is further enhanced by applying programmable enterprise policy. Policy may be applied or adjusted from direct interaction with the local system or via portals into the cloud services systems. Policy is then applied to the current state of the observation platform, the combination of commands being used, external system interactions, and user and/or device context, to determine the target or actions associated with each command or communication. The policy is controlled across the observation platform from a central computer associated with one or more observation platforms. This central computer may reside at any network location such as the enterprise server room or remotely and connected via a network, or in a shared resource such as in the cloud.

Combining communications, context information and programmable policy allows the observation platform to present the user with the most critical information, at the right time, and at the right location.

Applications (APPS) within the Observation Platform

An observation platform creating structured communications and gathering data is ideally suited to the integration of one or more applications that add functionality and/or modifies the policy controlling the communications flow and machine interactions. These applications are designed for and operate within the specialized environment of the observation platform. While the apps may be designed in a general nature and may run under a plethora of operating systems, each application works in conjunction with the methods and technology only found in an observation platform.

One or more applications running on the observation platform are responsible for defining the flow of communications, distribution of alerts or alarms, the data being gathered, and how the platform interacts with external systems. For example, within the set of overall operating applications is sub-set of applications that define the system behavior during urgent or emergency situations. In these situations, controlling what people hear, knowing where they are located, and using the policies established by enterprise is essential. This particular subset of specialty applications may be referred to as "emergency apps" which are included in the present technology.

Other applications are used to define an interface between users of the observation platform and with external systems. These apps provide a machine-to-machine interface, human-to-machine interface or a machine-to-human interface. One example of a human-machine interface would be a task management system issuing tasks either verbally or in machine language which is converted to audible tasks (or identification of tasks) and sent via policy and context to an individual or group. Then as the tasks are completed and acknowledged by a verbal or touch response from a user, the external task management system is updated via the observation platform computer interface.

Another example application is an interface between users and a third-party collaboration system (messaging and group messaging or discussion) such as Microsoft Office Teams, Cisco WebEX, Google Gsuite, or SLACK, or other text-based and/or video-based collaboration or documentation tools. As text is typed into the screen application, that text is converted to audible speech and played to one or more users as determined by the distribution settings in the third-party collaboration application 329 in conjunction with the policy settings within the observation platform. Conversely, as discussions are held between individuals and/or groups of users, the content of those discussions appear in text on the collaboration application 201-9. Additionally, either the collaboration application 201-9 or the observation platform may be used to assign names, define groups or control policy.

The apps running within the observation platform may be used to determine or specify which devices in the selected geography are to receive the message. For example, the controlling app(s) may specify that the message is only to be delivered to devices that are associated with the store manager(s) or may specify that all devices associated with a particular department or specific location are to receive the message. The specification of devices to receive the information may also be based on the context of the devices as determined by one or more of: the identity of the user (if identified) associated with the device, the characteristics of the signals being received by the device, the history of the signals that have been received by the device, the current or prior location of the device, the movement of the device, the current status of the device, or the historical metrics of the device or user associated with the device. In one embodiment, the device may be an external system that is responsive to the message and may be capable of taking further action.

Table 1 shows a non-exclusive set of application examples that may operate within an observation platform. The applications running on the computer controlling the observation platform are not limited to the examples shown in the example table. Additional apps be designed and/or licensed by external companies, developer groups, development organizations, or the enterprise controlling the observation platform.

TABLE 1

Application Examples

| Application Title | Functional Summary | Primary Statistics |
|---|---|---|
| Routine Communications | Creates virtual push-to-talk communication channels between individuals and groups based on commands, context and policy. Communications work within observation platforms, throughout extended observation platforms (see FIG. 2) across multiple observation platforms as determined by user contextand policy. | Source time, source location, destination IDs, destination locations, group IDs, message length, volley count, keywords spoken |
| Broadcast | Push-to-talk goes immediately to a single individual, a group, a group in a selected location, or all users in an observation platform or may extend to multiple observation platforms as determined by user context and policy. | Source time, source location, destination IDs, response times by ID, volley count, keywords spoken |
| Ad-hoc Group | Uses the broadcast function (above) and then allows those who quickly respond to create a private chat room for the duration of the conversation. Group re-call is included. | Source time, source location, destination IDs, response times by ID, chat duration, location of members, keywords spoken, |

TABLE 1-continued

Application Examples

| Application Title | Functional Summary | Primary Statistics |
|---|---|---|
| Daily Direction and Information | Assures information is pushed to users immediately or delayed per policy for individuals, groups, group roles, or group locations as determined by command, context and policy | recall count with same stats Type of message, time of message launch, message duration, message keywords, target group, individual listen times, listen-later button presses, location listened. |
| Location Task Management | This application assigns a task to a location and the task description is heard when an available employee is near the location. The employee may pick up the task or ignore it. The location task is ideal for walk-around management and measurement of employee willingness to complete tasks. | Time task sent to location, location, who hears and when, who takes the task, time taken, progress report times, completion time. |
| Request and Respond | Sets up a persistent request message for individuals or groups based on context and policy in anticipation of a user response. Provides for escalation to other users if response times are excessive as determined by policy. Includes API allowing external system to trigger activities such as "order pick-up", "customer is waiting in a certain location for product pick-up", or "customer arrival time is . . ." | Request type, source time, source location, destination IDs, response location, response times by ID, location velocity, physical arrival time. |
| Buy Online Pickup in Store (BOPIS) 201-11 | An integrated application that reacts to customer arrival information and then informs selected employees that the customer is ready to pick up their order as determined by policy. May be self-contained in the observation platform or integrated with an external system (see below). | Request time, user IDs notified, user locations, accepting user ID, probable customer location, acknowledge time, response time, time-to-close, close location. |
| Inventory verification and hold for pick-up | An application integrated with Internet ordering that triggers an immediate response if a customer desires to order a product where the inventory database shows that product below the safety stock level. For example, the application may request a group of the associates nearest to the product to verify that the product is actually on the shelf so that the internet site can take the order. | Time of request, time of response, listening user IDs, responding user ID, location of response, user speed to locate, safety stock level, quantity desired, quantity found, location found, storage location. |
| Button Response 201-8 | Button type, button name, time of request, users hearing request (IDs), user locations, user(s) acknowledging, time of acknowledge by user ID, acknowledging location(s). | Button name, button location, timestamp, hearing users, hearing user locations, accepting user, accepting location, accepting time, arrival time, device velocity |
| Performance Recognition 201-3 | These applications provide verbal recognition for outstanding employee performance as triggered by observation platform actions or external system reporting. Recognition may be at an individual level, group level, observation platform level or across multiple observation platforms based on policy and user context. | User ID, message type, message ID, source of message, text of message, target employee or group IDs, |
| Inventory Query | Checks available inventory based on enterprise database. Application provides information for price(s), quantity on-hand locally or in other stores, location of inventory, available inventory in other geographies and potential substitutes for SKUs in question | SKU, location, user ID, return success, return info, speed of response |
| Emergency Management and Response 201-6 | This set of apps is triggered by user command or from an external system alert. The alert is verbally presented to users based on their context and system policy. Examples of emergency apps include: disruptive visitor, shooter, fire, police, lost child, hazardous condition, medical emergency, evacuation, weather alert, etc. | Originator ID or origination system, timestamp, those hearing IDs, locations hearing, action requested, responding IDs, responding locations, responding times, user motions and velocity, time to reach requested location. |
| Training | Training apps are used for teaching the use of the devices within the observation platform or for training users regarding the products, vendors or brand messages of the enterprise. Product training apps may be sold to suppliers as a separate service. Training may be dynamic and uses the user's history in conjunction with context and policy to deliver training tidbits to the right ears, at the right time, in the right location. | User ID, training module ID, training attempts, timestamp, location where attempted, tap-outs, tap-out locations, tap-out step ID, training module duration, location where completed. |
| Kudos | This application is part of the employee motivation application suite. It allows users, external systems or managers to create a positive incentive message for rewarding employee performance. | Type of kudo, value of kudo, location originated, number of people hearing, location heard |
| Personality 201-10 | The personality apps change the sound of the voice or change the background sound to help the users differentiate the type of service they are interacting with and what actions are expected next. | Personality type ID, tap-outs, timestamp |
| Visitor Connection | Visitors to the enterprise may use their smartphones or personal devices to connect to users on the observation platform based on context information and enterprise policy | Source time, source location, destination IDs, destination locations, group IDs, message length, volley count, keywords spoken |
| Expert Groups | This application responds to a question and connects the questioner with knowledgeable users. The system may be programmed with skill tables or, using machine learning, may determine who is knowledgeable in a given subject area from responses to the As-hoc Group app. Experts are selected for a question based on context and enterprise policy. | Question asked, question type, ask time, asking user ID, asking location, hearing users IDs, hearing user locations, response times, quality of response indicator, |
| Mandatory Response | This application requires a clear verbal response to important messages. Failure to respond may result in limiting the user's capabilities within the observation platform or continually reminding the user that a response is necessary as determined by enterprise policy. | Request type, source time, source location, destination IDs, response location, response times by ID, recording of verbal acknowledgment. |

TABLE 1-continued

Application Examples

| Application Title | Functional Summary | Primary Statistics |
|---|---|---|
| Collaborative Application 201-9 Integration (e.g., Microsoft Teams, Cisco WebEX, Google Gsuite, or SLACK) | Allows a seamless integration with an external collaboration platform that lets users read the content of conversations taking place on the floor and sends audible notes from the desktop to the floor. Also allows the creation of users and on one platform to automatically synchronize to the other platform. | Wordcount sent/received, volley counts, thread duration, thread member count |
| Slot Machine Integration | This application connects external systems such as slot machines to the observation platform so that users are alerted to machine status and can interact with the software of the external system though voice control and button interactions. | Type of action request, response time to request, location of request, location of responder, history of action request |
| Shoplifting | This application allows a single command or code to initiate messages to a group or groups of associates that there is a potential theft problem at a location. The application allows coordination of employees through audible messages and location tracking. | Event start time, location, who reported, who heard, conversation contributors, event end time |
| Name Pronunciation Intelligent Synthesis | This application records the user's name when they logon or respond to a request and uses the phonetics of their pronunciation to automatically adjust the how the system pronounces their name and tunes the lexicon for improved name recognition. | Percentage of names needing modifications, recognition pre and post modification, name recognition accuracy from others, name recognition accuracy from user. |
| Time Clock Integration | This application allows integration with time-clock systems which provides users an alternate method of clocking in/out or to retrieve information from the time tracking system. The application may inform employees who are on the system that they have not clocked in yet. | Clock in/out times, employee verification data, |
| Task Management Integration | The task integration application is capable of presenting tasks to employees in either a mandatory or voluntary manner, track task progress and measure task completion and accuracy. | Open task list, task offering group, accepting employee, task start time, task completion time, task accuracy assessment |
| IoT Control Application 201-7 | Allows Internet-of-Things (IoT) systems and devices to respond to instructions issued by the observation platform or users of the devices within the observation platform. IoT devices and systems can also send information to users for requesting action or providing useful information. | Command issued, IoT or user response, timestamp, users notified, user IDs, user locations |
| Asset Tracking | Integrates with third-party applications for tracking of equipment or inventory within the geography of an observation platform. | Last seen timestamp, movement history, accuracy estimate, max velocity, current location |
| Computer Telephony Integration | Uses the Cisco Unified Contact Center Express Computer Telephony Integration (CTI) protocol to determine where an incoming call is parked and alerts a user or group of users based on context and policy of the call waiting. | Call arrival time, notification time, users notified, response time, call park location, responding user, responding location, length of call. |
| External Systems Integration 327 | These applications provide an Application Programming Interface (API)or a gateway function that connects the observation platform to external computer systems. For example, external computer systems may be collaboration programs, database query programs, time-clock tracking programs, task management programs | API call time, involved devices or users, target systems or locations, other metrics relevant to the external system requests or actions |
| Content Distribution Manager (CDM) Application | This application resides partially on the observation platform computer and on a website accessible via a smartphone or a terminal. The CDM can distribute messages and information across multiple observation platforms and is used to target individuals, roles or groups of users. | Who had heard, who has not heard, who "taps-out", location heard, message length |

Table 1 shows a simple title for an application which may not be the commercial name of that application, a brief description how the application interacts with the users or system, and a set of primary or elementary statistics that are gathered and associated with each application. It should be appreciated that additional primary statistics are typically gathered for any application operating within the observation platform. Table 2 shows a non-exclusive list of example "common" primary statistics that are gathered for most all applications. These common primary statistics are in addition to the application-specific primary statistics shown in Table 1.

TABLE 2

Common Primary Statistics for Applications

| Source Generated Stats | Destination Generated Stats | Message Related Stats |
|---|---|---|
| Device ID | Device ID | Duration |
| User ID | User ID or Group ID | Keywords |
| Location | Location | Target ID's |
| Initiated Time | Time notified or played | Num and ID of intended recipients |
| Type | Time of notification receipt | Num and ID of recipients played |
| Duration (if applicable) | Length of communication listened to | Tap-outs and times |
| | % Message listened to -> (Length of listened/ Original duration) | Intended that did not hear |
| | Listen later | Type (broadcast, 1:1, etc.) |
| | Tap-out | Keywords spoken |
| | Response time | Number of volleys |

An observation platform running the associated applications may be employed in various environments such as retail settings, public-stage floors, outdoor venues, concerts, police scenarios, disaster areas, schools, sporting events, hospitality operations, gaming locations, events, security operations, military operations, a prison organization, customer service, manufacturing organization, factories, schools, warehouses, and other environments where humans gather together and where communications occur between users and/or computer systems. Any reference to any one of these environments in the discussion below, such as "retail settings," is stipulated to include the entire set of possible environments.

Managing Applications on an Observation Platform

Applications define the details of how the observation platform structures the communications flow, alerts, alarms and interactive behavior of external systems or databases.

The applications primarily reside on the computer controlling the observation platform with only minimal reliance on the software capabilities of the mobile devices. The applications are configured and enabled via a cloud-based central control computer accessed through a URL or directly. This central control computer communicates with the observation platform computer using occasional access via standard network technologies (e.g., Internet) and is used to maintain the operating system, core software, and applications by enabling new software downloads, policy modification, software updates, or error correcting software patches.

FIG. 2A shows an overview of example applications and how they relate to one or more observation platforms and their respective environments, according to various embodiments. Each application, as shown in functional application suite 200, is remotely provisionable, meaning the applications is configured, deployed and monitored by the cloud services and configuration control platform 220 ("cloud services platform") and the application deployment and updates component 230. For example, applications may be selected and configured via cloud services configuration and control platform 220, while application deployment and updates component 230 operates to download the application to computer 120, device 115, or other component in the environment 100 associated with an observation system. In some embodiments, application deployments and updates component 230 may be combined or a subcomponent of cloud services and configuration control platform 220. Suite 200 lists only a fraction of the possible applications hence the list of applications may be longer and more detailed than shown in the diagram.

The applications are loaded to the observation platform computer system 120-1 which may be co-located with the observation platform as shown by environment 100-1 or may be connected remotely to environment 100-1 using a cloud-based computer system 120A-1 (as illustrated in FIG. 2B). Additionally, a plurality of other environments 100 (e.g., 100-1, 100-2 ... 100-N) may exist and some or all may be communicatively coupled to form an extended observation platform.

The functional application suite 200 ranges from simplistic one-to-one communications to full control and interaction with other systems and applications including necessary application programming interfaces (APIs). See Table 1 for a more comprehensive description of some of the example applications and the data gathered with each one.

Application(s) 201 may have pre-existing components resident on the observation platform computer 120-1 or 120A-1 of environment 100-1, or the application(s) 201 may exist separately so that when the application(s) is/are deployed via the application deployment and update component 230, the designated application(s) interact(s) through the internal API to become active. Since each application is configurable for each observation platform environment, central control is exercised through the cloud services platform 220 for configuration of the application details and the data gathering formats.

Applications may be enhanced and/or updated though the cloud services routines for application deployment and updates component 230. This arrangement may replace a portion or the whole software program of the designated application. Cloud-based servers are connected to each observation platform through standard networking technologies.

Figure 3:
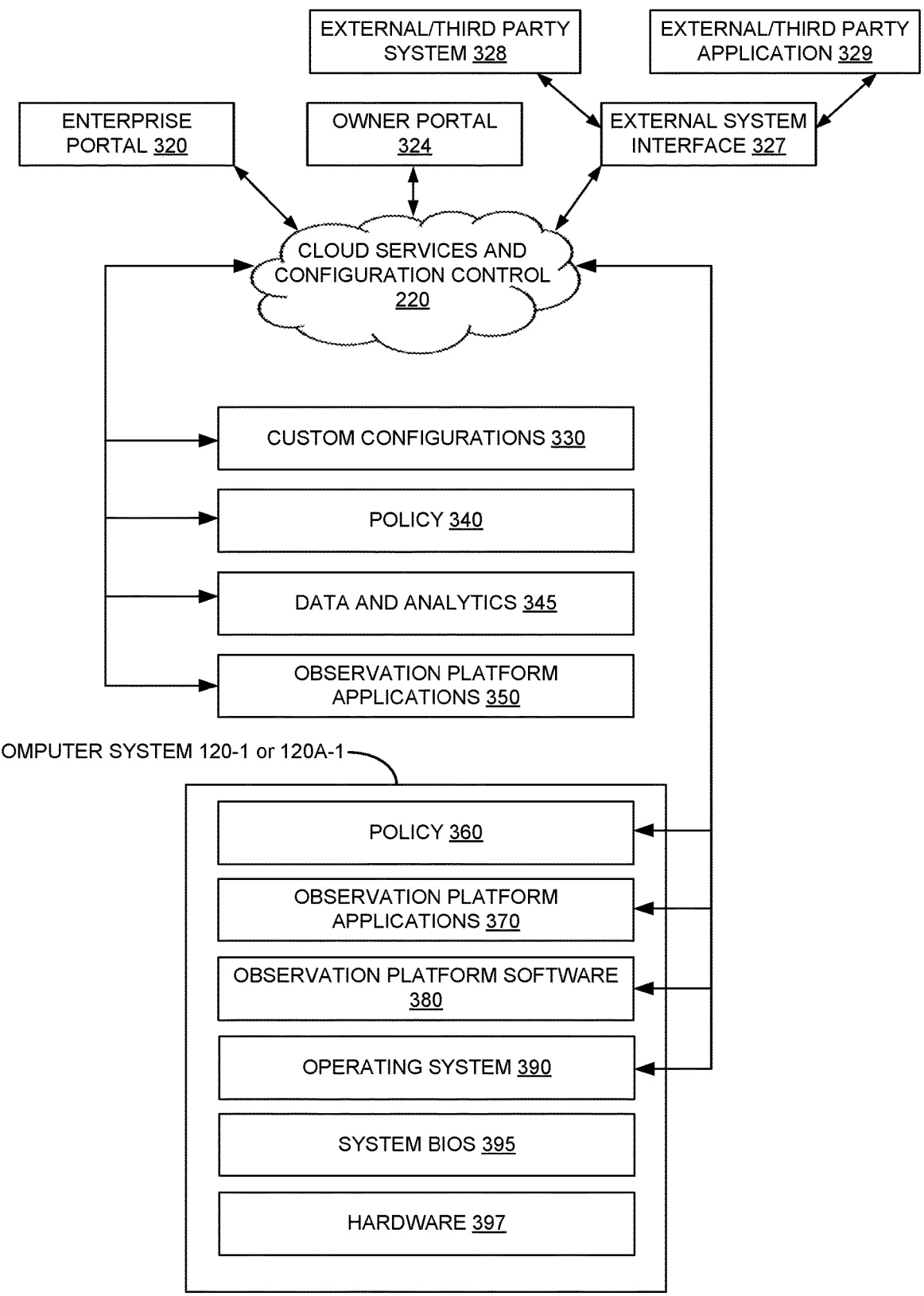
FIG. 3 illustrates how the software on an observation platform is distributed, updated, configured, and controlled using cloud services and portals into the system computer.

As illustrated in FIG. 3, the cloud services are accessed via portals at the enterprise 320 or portals with the software owner or licensor 324. The portals access control over the cloud services via traditional connections over the Internet and/or via private networks. External systems interface 327 operates to couple one or more observation platforms and the components in their respective environments 100 via the cloud services platform 220 with one or more systems 328 and/or applications 329 external to the one or more observation platforms. For example, external (third party) systems 328 may access the cloud services platform, via the external system interface 327, for: controlling configurations, establishing policy, modifying policy, deploying applications, enabling applications, accessing data, and/or analyzing data Likewise, external (third party) applications 329, which may be resident on external systems 328, may also access the cloud services platform for controlling configurations, establishing policy, modifying policy, deploying applications, enabling applications, accessing data, and/or analyzing data via the external system interface 327. In some embodiments, an external application 329 is an application which provides text-based, speech-based, or video-based collaboration software for facilitating collaboration and communication between users who are remote from one another; some examples of such collaboration software include: Microsoft Teams, Cisco WebEX, Google Gsuite, or SLACK.

With continued reference to FIG. 3 and also with reference to FIGS. 2A and 2B, the cloud services and configuration control platform 220 services communicate with the observation platform computer via conventional network connections or the Internet. It is understood that this communication channel may be encrypted, employ proxy nodes, or otherwise implement various levels of data security. The observation platform computer in an environment such as environment 100-1 may be a cloud-based computer 120A-1 remote from the geographic scope of other components of the observation platform or may be a locally resident in-platform computer 120 located within the geographic scope of the observation platform.

The observation platform computer (e.g., 120-1, 120A-1, 120-2, etc.) is part of the extended observation platform set (100-1, 100-2, ... , 100-N) which depicts one or more relevant observation platform sites, geographies, or collections of components. Within each environment 100 exists the configurations as described in FIGS. 1A, 1B, 2A, and 2B, including the wireless infrastructure of access points (APs) 115 (e.g., 115-1, 115-2, 115-1A, 115-1B, 115-1B, etc.) which may be radio base stations, internal networking devices 135 (such as switches, gateways and routers), mobile devices 105, and the users 106 of the mobile devices 105. Also shown in the extended observation platform of FIGS. 2A and 2B is the manager application 240, which is a separate application running on a smartphone or smart device and used in conjunction with the observation platform(s) to communicate, manage and monitor the other devices and systems connected within the observation platform. In one embodiment, the manager application 240 may run on any device which may be owned by the user, enterprise, or system owner.

Other external systems 250 and other external databases 255 may operate within the observation platform for functions such as inventory levels, inventory locations, knowledgebases, task management, time clocks, employee information, point-of-sale data, asset tracking, smart shelves, emergency systems, IoT devices, etc.

With reference again to FIG. 3, FIG. 3 illustrates how the application software and operating software is maintained and distributed throughout the components of the observation platform.

The cloud services and configuration control platform 220 manages the observation platform applications 350; stores, modifies and controls how policy 360 is determined and employed plus determines the data collection strategy and analytics management 345; and allows policy or manual configuration of application options 330.

The stored enterprise policy 340 in the cloud services and configuration control platform 220 is used to automatically configure parameters in the observation platform of a computer system 120-1 or 120A-1 in an environment, such as environment 100-1, for optimizing the observation platform software along with the application software for most closely meeting the requirements desired by the controlling enterprise. Policy 360, operating on the observation platform, is determined by a combination of input controls into the cloud services and configuration control platform 220 for defining the details of the policy 360, while also using the data and analytics of software module 345 to refine the policy 360 using machine learning techniques or Artificial Intelligence. The updated policy 360 is then deployed from stored enterprise policy 340 to the observation platform computer system 120-1 or 120A-1 via the cloud services and configuration control platform 220.

Adjustments to one or more of the custom configurations 330, enterprise policy 340, data and analytics 345, and the observation platform applications 350, are accomplished via portal access from the system owner portal 324, the enterprise operator portal 320, or external computer systems interface 328. Manual or external adjustments of each application 370 deployed in an observation platform and the parameters controlling the observation platform software 380 via the cloud services configuration and control platform 220 allow each observation platform to behave differently as desired by the owner or controlling enterprise. The external system interface 327 to the cloud services and configuration control platform 220 permits external computer and database systems to change the behavior of the observation platform computer system 120-1 or 120A-1 or interact directly with the applications 370 in operation.

The cloud services and configuration control platform 220 is also responsible for downloading changes to the operating system 390, applications 370, and other software components. Management of software updates, revisions, maintenance releases, system bios 395, configuration of hardware 397, and license validations are performed through the cloud services and configuration control platform 220. It is understood that the cloud services and configuration control platform 220 provides automation and easy access to all software changes but is not the only means of making changes in the observation platform computer programs. There are frequently many ways to access and modify software on computers and these means may or may not be available depending on the specific configuration of the observation platform computer(s) by the controlling enterprise or system owner, or the network access requirements.

Example Method of Managing Structured Communications within an Observation Platform With reference now to FIGS. 4A-4B, flow diagram 400 illustrates an example method of structuring communication within an observation platform, according to various embodiments. Although specific procedures are disclosed in flow diagram 400, such procedures are exemplary. That is, embodiments of the present invention are well suited to performing various other procedures or variations of the procedures recited in flow diagram 400. It is appreciated that the procedures in flow diagram 400 may be performed in an order different than presented, and that not all of the procedures in flow diagram 400 may be performed. In some embodiments, procedures of flow diagram 400 may be implemented by one or more processors of one or some combination of computer systems and/or may be stored in a non-transitory computer readable/useable store media (e.g., in a memory, memory device, disk, or the like).

At 410 of FIG. 4A, responsive to a request interaction, a computer system such as computer system 120-1, sets up an action request regarding a structured communication in the observation platform (e.g., the observation platform of environment 100-1) of which it is a component. The request interaction may take any suitable form, some non-limiting examples of which include: a speech or text user command received via a device 105 (e.g., via device 105-1); a button action from a user received via a device (e.g., via device 105-1); and/or proximity detection event received via a device 105 (e.g., via device 105-1), an access point 115, or computer system 120-1. In some embodiments, the interaction request may come from a source external to the observation platform, such as from an external system 150 which initiates an action request to the observation platform. The request interaction may specify the type of action that is requested or a particular type of action request may be associated with a particular request interaction.

At 420 of FIG. 4A, the action request is analyzed with respect to a programmable policy of the observation platform and applications installed on the observation platform. The analysis of the action request may be performed by the computer associated with the observation platform (e.g., with respect to environment 100-1 of FIG. 2A, computer 120-1 may perform the analysis) or by the cloud services and configuration control platform (FIG. 2A, 220) to determine if there is an enterprise programmable policy 360 applicable to the action request. For example, if the action request is to send an announcement to all the stores in a chain, the policy 360 may require that the announcement is first sent to list of approving managers before being disseminated throughout all of the stores.

At 430 of FIG. 4A, the action request is analyzed with respect to context in the observation platform associated with the action request. In some embodiments, the context is one of user context in the observation platform and device context in the observation platform. The action request may be analyzed by the computer associated with the observation platform (e.g., computer system 120-1 in FIG. 2A) to determine if context of the users and/or devices are applicable to the action request. At this level, the determination of how to handle the action request may be made by the application, and its configuration, on the computer associated with the observation platform. For example, a chain-wide announcement of a price change for a kitchen item might be constrained to those users 106 who are identified as cashiers, users 106 located near the registers, users 106 who are identified as experts in kitchens, users 106 who are located in kitchens or household goods sections of stores, and/or users 106 who are store managers.

At 440 of FIG. 4A, the action request is analyzed with respect to status in the observation platform, where the status is one of user status in the observation platform and device status in the observation platform. For example, in some embodiments, the action request is analyzed by the computer associated with the observation platform (e.g., computer system 120-1 in FIG. 2A) and evaluated against the user and/or device status for further determination of how to structure the communication. For example, if one or more of the users 106 who are cashiers in the previous example have signaled that they are engaged, the announcement sent to the device(s) 115 associated with those user(s) 115A may be delayed until they indicate that they are no longer engaged.

At 450 of FIG. 4A, an action in the observation platform is moderated with respect to the structured communication based on results of the policy, context, and status analyses. For example, the computer associated with the observation platform (e.g., computer system 120-1 in FIG. 2A) takes into account the prior actions of 420, 430, and 440 and moderates a structured communication to one or more devices 105 of the observation platform. This moderation may include: enabling or permitting the structured communication to be sent to certain device(s) 105, modified the structured communication (e.g., sending it to a device of a different user if a first user is occupied), delaying delivery or play on a device 105 of the structured communication until a later time; or inhibited the structured communication from being sent to or played at one or more devices 105. Likewise, the structured communication may be moderated, in a similar manner across one or more communicatively coupled observation platforms (see e.g., FIG. 1B).

Referring now to FIG. 4B, at 460, in some embodiments, data from the observation platform is collected in relation to the structured communication. The collected data may be analyzed as it is collected, stored for one or more of analysis, used in making policy decisions, used in making context decisions, and used in formulating one or more reports. The collected data may include one or more primary and/or secondary statistics collected throughout process 400. The data may include one or both of system performance data and user performance data which may be stored locally in the observation platform which collects it or sent to an external database 160. The data may be used for analysis of how the action request was handled, which devices and/or users were involved, what happened, when it happened and the circumstances surrounding the action or event. The resulting output may then be used with respect to the observation platform and its environment 100 to tune the programmable policy, adjust the application configurations, interact with external systems, and/or generate reports for key performance measurements (KPIs) or decision making by managers, employees, supervisors, or other users.

Description of Example Applications

Applications, such as application 201 of application suite 200 are used to implement selected features and functions in the environment 100 associated with each observation platform. The following paragraphs provide a description of some of the example applications along with additional details for the example data and statistics that are collected with the use of some of the applications.

Example Method of Managing Emergency Management Information

With reference now to FIGS. 5A-5D, flow diagram 500 illustrates an example method of managing emergency management information within an observation platform, according to various embodiments. Although specific procedures are disclosed in flow diagram 500, such procedures are exemplary. That is, embodiments of the present invention are well suited to performing various other procedures or variations of the procedures recited in flow diagram 500. It is appreciated that the procedures in flow diagram 500 may be performed in an order different than presented, and that not all of the procedures in flow diagram 500 may be performed. In some embodiments, procedures of flow diagram 500 may be implemented by one or more processors of one or some combination of computer systems and/or may be stored in a non-transitory computer readable/useable store media (e.g., in a memory, memory device, disk, or the like).

At 510 of FIG. 5A, in one embodiment, an emergency management and response application 201-6 is provisioned at an observation platform. In some embodiments, the provisioning of the is administered by a cloud services platform such as cloud services and configuration control platform 220 (FIGS. 2A, 2B, and 3) in collaboration with a computer 120 of the observation platform. The provisioning includes installation, configuration, and/or deployment of the emergency management and response application 201-6 within the environment 100 of the observation platform. For example, as depicted in FIG. 2A, in one embodiment, an application such as emergency application 201-6 (in a suite of applications 200) may be provisioned to a computer system 120 of an observation platform to enable emergency management and response via the observation platform and its associated devices 105. The provisioning comprises installing the application on a computer system (e.g., computer system 120-1) associated with the environment (e.g., 100-1) of the observation platform. For example, the emergency application 201-6 (also referred to as the "emergency management and response application") is configured and deployed to the observation platform using the cloud services platform 220 as described in FIG. 3. Configuring the application may further enable the APIs in the observation platform to connect with external systems or IoT devices for the purpose of exchanging information relative to any urgent or emergency condition.

At 520 of FIG. 5A, in one embodiment, a communicative connection between the emergency management and response application 201-6 and a system external to the observation platform the observation platform is established. This communicative connection is established via a gateway such as external system interface 327 of the cloud services platform. For example, in some embodiments, the cloud services and configuration control platform 220 provides a communicative coupling/connection to external, third-party, or IoT systems either locally or through the cloud-based gateway function of external system interface 327.

At 530 of FIG. 5A, in one embodiment, operation of the emergency management and response application 201-6 within the observation platform is triggered. This triggering is, in one embodiment, in response to receipt at the observation platform of a report of an emergency from either recognizing key words in a speech segment from a verbal command or from an external system.

In some embodiments, one or more users 106 may trigger the operation of the emergency management and response application 201-6 with a verbal command or a textual command sent from a device 105. In one example, user 106-1 may trigger operation of the emergency management and response application 201-6 by sending a voice command to computer system 120-1 via device 105-1. In another example, user 106-1 may trigger operation of the emergency management and response application 201-6 by sending a text command to computer system 120-1 via device 105-2. In another example, user 106-1 may utilize device 105-1 to transmit voice or text information to another device (e.g., device 105-2), which is routed through and monitored by computer 120-1. As part of its monitoring role, computer system 120-1, may trigger operation of the emergency management and response application 201-6 based upon enterprise policy 360 (e.g., policy of a company/organization) which invokes triggering in response to certain phrase words or phrases (e.g., "fire," "robbery," "earthquake," etc.) alone or in context with other data monitored by computer system 120-1. For example, in one embodiment, if two or more users use the same or similar term (e.g., "earthquake" and "things are shaking") in a specified span of time, then the emergency management and response application 201-6 will be triggered.

In some embodiments, operation of the emergency management and response 206 may be triggered from an external system such as fire alarm system, intrusion alarm system, video analysis system, security system, IoT systems, an emergency weather reporting system, a disaster warning system, or other systems designed to detect and react to urgent or emergency situations. These external systems may be coupled directly to computer system 120-1 of environment 100-1 (e.g., they may be within and part of environment 100-1) of an observation platform and/or they may be coupled to environment 100-1 and computer 120-1 via external system interface 327.

At 540 of FIG. 5A, in one embodiment, emergency management information is sent from the emergency management and response application 201-6, to one user (e.g., user 106-1) or a group of users 106 of the observation platform. The emergency management information includes at least one of an alert related to the emergency and instructions related to the emergency. For example, the emergency alert may say "Tornado Warning" and/or the instructions may be to "proceed to the tornado shelter." The emergency management and response information may be sent to a device 105 associated with each user 106 being notified.

The alert may contain information regarding the nature of the problem/emergency, the location of the problem/emergency, the location and/or number of users impacted by the problem/emergency, the severity of the problem/emergency; time of occurrence of the problem/emergency, and/or may provide instructions or directions for actions to be taken.

Consider, for example, an emergency involving a person appearing to cause harm with a weapon in a store or hospitality venue. In one such embodiment, the emergency management and response application 201-6 of the observation platform may alert users to the person and provide users with information of the location of the danger and what actions to take.

With reference now to 560 of FIG. 5B, in some embodiments, the emergency management and response application 201-6 of the observation platform escalates the emergency management information to a larger audience based on a type of the emergency or based on other information. For example, a tornado warning may be broadcast over an intercom or speakers in the environment 100-1 which are communicatively coupled with computer system 120-1. In another embodiment, the emergency management information may be sent to external systems (e.g., via external systems interface 327). Some examples of external systems include a 911 emergency reporting system for police, fire, or ambulance response. For example, a robbery may be reported to police first responders; a fire may be reported to fire first responders; and an injury may be reported to medical first responders. In other embodiments, certain additional users may be provided with the emergency management information depending on their location (e.g., in case they may help or need to take evasive action), context (e.g., they have availability to help), status (e.g., owner of the facility in which the emergency is taking place), role (e.g., the person is a manager or supervisor), group (e.g., the user is a security person and a robbery is taking place); membership, function (e.g., the user is trained in first aid and the emergency is medical in nature), or external system purpose.

With reference to the previous example of a person with a weapon, the emergency management and response application 201-6 may also alert an escalation chain of users in other locations, such as remote managers or corporate security forces, through direct connections to external systems. In one embodiment, the external system may directly contact the local police department or an external security firm and inform them of the situation, plus any relevant information contained in conversations or in the data being captured during the event. At the same time, the emergency management and response application 201-6 of the observation platform may request that all employees in the area provide a personal health status, damage or risk assessment, or information regarding injuries.

The escalation may include the emergency management and response application 201-6 adding an increasing number of resources, either user or system resources, if proper responses are not detected from the initial group of users being notified. In one embodiment, the emergency management and response application 201-6 may also notify remote groups such as an enterprise organization or may notify other external systems. One or more escalation stages may be programmed into the system policy controlling the action of the observation platform to the inputs from the emergency application. An alert or request for action may repeat until the acknowledgement is received and accepted by the observation platform. The emergency management and response application 201-6 may invoke features of other applications such as the personality application 201-10 which would change the sound of the system voice to a personality associated with urgent or emergency situations.

In one embodiment, the emergency management and response application 201-6 may distribute instructions for action, such as: a description for use in finding a lost child; a direction to evacuate a building, possibly including the reason for evacuation and/or a route to take from the location of the user; a direction to shelter in designated locations, possibly including the reason for requiring shelter and the amount of time left before sheltering is required; and/or or to a direction to remain clear of a geographic location possibly including a map showing the geographic location. Users or devices receiving a request for action may be asked for a particular response or acknowledgment assuring that they understood the request. Users or devices may be asked for updates for the current actions taking place or actions planned. In one embodiment, external systems connected with the observation platform, as shown in 250, may interact with the emergency application in a machine-to-machine manner.

With reference to 560 of FIG. 5C, in one embodiment, responses of users of the group of users (the group to which emergency management information was sent) are monitored by emergency management and response application

201-6. For example, user 106 or device 105 locations may be tracked and reported for analysis, generation of new or additional instructions, and delivery of system messages and/or requests to the users 106 or devices 105.

At 570 of FIG. 5C, in one embodiment, based on the user responses, emergency management and response application 201-6 determines a status of an overall emergency response (to the reported emergency) in comparison to a default emergency response plan configured into the emergency management and response application 201-6 as part of an enterprise policy on the observation platform. By tracking user responses and/or user/device behavior throughout the emergency situation or event, detailed and individual instructions can be delivered to the users or devices needing to take specific actions. These instructions may be generated automatically based on policy and/or historical data or may involve additional user action. Based on the status, the emergency management and response application 201-6 may take no additional action (if things are going well), send repeated or supplemental emergency management information, and or take escalation actions.

With reference now to 580 of FIG. 5D, in one embodiment, data and primary statistics are gathered from users of the group of users (e.g., from users of the group of users to whom the emergency management information was sent). In some embodiments data and primary statistics may comprise one or more of: a task name (of an assigned task); a task status (e.g., not started, partially completed, completed, unable to complete, etc.); a timestamp for when a task was offered; a timestamp for when a task was assigned; a timestamp for when a task was accepted; a timestamp for when a task was updated; a timestamp for when a task was completed; location information of one or more users of the group of users; motion and velocity information of one or more users of the group of users; and interactions between users of the group of users (e.g., counts of communications, durations of communications, exchanged textual information, exchanged voice information, proximity information of users of the group of users, etc.).

The emergency management and response application 201-6 may collect data and primary statistics for tracking all users, conversations, commands, and actions during the emergency situation. Examples of such data and primary statistics may include: an originator ID or origination system; a timestamp of the event start; an identification of devices or users hearing the notifications and/or requests; the locations where notifications are heard; the actions requested; responding users; non-responding users; the locations where responding users respond; responding times; user motions to include acceleration, and velocity, and, if applicable; and the time required after notification is received to reach a requested location. All data and primary statistics may be archived and used to develop, modify, or immediately modify the stored enterprise policy 340 controlling the fundamental emergency application 201-6, or the policy 360 governing the manner in which the emergency application 201-6 runs on the specific observation platform.

The primary statistics can then be post-processed into secondary statistics or analytics to reconstruct the situation; attribute actions to users; send audible messages to users or managers; revise or tune policy affecting the application, and/or adjust enterprise policy 340, observation platform policy 360 for how to improve the management and response of the emergency management and response application 201-6.

Collaboration Integration Application

With reference now to FIGS. 6A-6B, flow diagram 600 illustrates an example method of observation platform collaboration integration, according to various embodiments. Although specific procedures are disclosed in flow diagram 600, such procedures are exemplary. That is, embodiments of the present invention are well suited to performing various other procedures or variations of the procedures recited in flow diagram 600. It is appreciated that the procedures in flow diagram 600 may be performed in an order different than presented, and that not all of the procedures in flow diagram 600 may be performed. In some embodiments, procedures of flow diagram 600 may be implemented by one or more processors of one or some combination of computer systems and/or may be stored in a non-transitory computer readable/usable store media (e.g., in a memory, memory device, disk, or the like).

At 610 of FIG. 6A, in one embodiment, a collaboration application 201-9 is provisioned at an observation platform. For example, the collaboration application 201-9 may be provisioned onto a computer system 120-1 of the environment 100-1 of an observation platform. In some embodiments the provisioning is administered by a cloud services platform 220 in collaboration with a computer system 120 of the observation platform. The provisioning includes configuration and deployment of the collaboration application 201-9 within the observation platform.

Using this collaboration application 201-9, the observation platform connects to a third-party application 329 (which may be a collaboration application) using a gateway/external systems interface 327 into the system Application Program Interface (API).

At 620 of FIG. 6A, in one embodiment, an automation software component for resident installation at an external collaboration application is sent from the observation platform to the third-party/external collaboration application 329. The third-party collaboration application is external to an environment 100 of the observation platform and, thus, may be referred to as an "external collaboration application" or a "cloud-based application." The automation software component is a separate function operating in the external collaboration application 329, similar to a 'bot,' and may be or include an application program interface (API). The automation software component organizes information existing in the third-party application 329 and allows the third-party application 329 to exchange that information through a cloud-based gateway (e.g., gateway/interface 327) to the observation platform.

At 630 of FIG. 6A, in one embodiment, the collaboration application 201-9 is communicatively coupled, via the cloud-based gateway 327, with the external collaboration application 329 to facilitate communication and information exchange.

At 640 of FIG. 6A, in one embodiment, user information and task information is synchronized between the collaboration application 201-9 and the external collaboration application 329. In some embodiments, at least a portion of the user information received from the external collaboration application is provided by the automation software component. For example, in one embodiment, the observation platform collaboration application 201-9 can interconnect with a collaboration application which facilitates sharing text, audio, and video collaboratively between devices/platforms.

In some embodiments, the synchronized user information and task information comprises user information such as:

profile information, functions, titles, group memberships, roles, skills, talents, expertise, departmental information, reporting structure, and enterprise hierarchy. In some embodiments, the synchronized user information and task information comprises user information such as: user status information such as: whether the user is currently available for tasking; whether the user is presently engaged in a task; whether the user is currently in a conversation; whether the user is currently listening to messages, whether the user is currently listening to training; whether the user is currently listening to announcements, and whether the user is currently out-of-range. In some embodiments, the synchronized user information and task information comprises task information such as: available tasks, assigned tasks, task status, task owner, task origination date, task acceptance time, and task completion time.

Some non-limiting examples of such external collaboration applications 329 include: Microsoft Teams, Cisco WebEX, Google Gsuite, or SLACK. By way of example and not of limitation, some example operations are described below with reference to using Microsoft Teams as the external collaboration application 329. Though Microsoft Teams is utilized as the example third-party external collaboration application, it should be understood that the same or a similar set of operations may be performed with text-based, speech-based, and/or image-based/video-based collaboration applications from other developers and suppliers.

Microsoft Teams is representative of text-based collaboration applications 329 used in many offices and enterprises to coordinate information and activities for the users. The interconnection of external third-party collaboration applications 329 with the observation platform enables frictionless interworking (text-to-speech and speech-to-text) between the interconnected platforms so users on either platform can easily communicate (initiate and respond) between the text-based external application 329 and the speech-based observation platform application. Typing on the text-based external collaboration application 329 may result in the typed words being translated to speech so that users 106 of devices 105 in the observation platform can hear the typed words without referencing a screen. Similarly, words spoken by a user 106 to a device 105 in the observation platform may be translated to text for display on the text-based external third-party collaboration application 329. Histories of conversations may be retained by either the observation system or the external third-party collaboration application for later playback, analysis and/or reporting.

Integration of the internal and external collaboration applications using the present technology assures synchronization between the external collaboration application 329 operating in the cloud and the collaboration application 201-9 operating within the observation platform as shown. Synchronization provides a cross-linkage of user profile information such as user names, functions, titles, group memberships, roles, skills, talents, expertise, departmental information, reporting structure, and enterprise hierarchy. Using this synchronization operation, users may be added or deleted using either the internal or external collaboration application and all associated information regarding the user would be automatically connected or linked.

In addition to user profile information, the two platforms may exchange user status/state information such as: whether the user 106 of a device 105 is online; whether the user 106 of a device 105 is offline; whether the user 106 of a device 105 is engaged in a task or with a customer; whether the user 106 of a device 105 is in a conversation; whether the user 106 of a device 105 is listening to messages on the device 105; whether the user 106 of a device 105 is listening to training on the device 105; whether the user 106 of a device 105 is listening to announcements on the device; and/or whether the device 105 associated with a user 106 is out-of-range of a base station/access point 115.

The external collaboration application 329 may trigger actions in the observation platform(s) based on the request of the application as structured by enterprise policy on the observation platform and/or addressed by context and status within the observation platform(s) or the corresponding collaboration application 201-9 running on the observation platform.

Another function frequently incorporated into third-party collaboration applications 329 is a task management and tracking process. This task management/tasking process may be extended to the observation platform through the integration and synchronization of the two platforms. In one embodiment, tasks may be assigned using text on the third-party application 329 and be received as speech on the observation platform. Task acceptance and/or completion may then be stated verbally on the observation platform and show as accepted and/or completed on the third-party application 329.

The request for task action, sent by the external collaboration application 329, may repeat until the acknowledgement is accepted by the observation platform from the device 105 of a user 106 being targeted for task action. The external collaboration application 329 may invoke features of other applications 201 such as a Personality application 201-10 which would change the sound, volume, or tone of the system voice to portray the voice of a personality associated with urgent or emergency situations.

Each task may be tracked against a planned schedule of completion as determined by the cloud-based third-party external collaboration application 329. If a task progress report or completion date falls behind the scheduled date/time, the observation platform may provide a notification of a missed milestone and/or escalate the notification to a higher-level set of users or managers.

The external collaboration application 329 may encompass other functions beyond task management. It is understood that the observation platform will expand to encompass other functions and operations via installation of functional applications and communicative couplings to external applications 329 and/or external systems 328. The synchronization process between the external collaboration application 329 and the observation platform collaboration application 201-9 will enable the exchange of capabilities and information between both applications The synchronization function within the observation platform is designed to allow migration of added functions to the observation platform as the external collaboration application 329 is enhanced.

With reference to 650 of FIG. 6B, in some embodiments, data and primary statistics are gathered by the observation platform. The data and primary statistics are associated with users 106 and/or tasks. In some embodiments, the observation platform analyzes the gathered data and primary statistics. In some embodiments, the gathered data and primary statistics and/or the analysis results may be provided to the external third-party collaboration application 329 for use in task management and tracking by the external collaboration application 329. In some embodiments, the results of the analysis may be used within the collaboration application 201-9 or by the external collaboration application 201-9 for verbally or textually nudging compliance or escalating non-compliance with the task or task schedule.

Data may include task data, such as data about: task name; available tasks; assigned tasks; task status (e.g., completed, not completed, nearly completed, not started, not able to complete); task owner; task origination date; task acceptance date; task completion date; a timestamp for when a task was offered; a timestamp for when a task was assigned; a timestamp for when a task was accepted; a timestamp for when a task was updated; a timestamp for when a task was completed; location information of one or more users; and a location, textual, or voice interaction between users of the observation platform. As the data is organized and analyzed by the observation platform, the observation platform may determine that additional communication to the users would be useful or that it is time to request updates or follow-up information for open items or incomplete discussions. In one embodiment, the observation platform may produce visual or verbal reports regarding task status and user performance for evaluation by enterprise personnel or by external systems. In some embodiments, the gathered data and primary statistics and/or the analysis results may be provided to the external third-party collaboration application 329 for use in task management and tracking by the external collaboration application 329.

In some embodiments, primary statistics are post-processed into secondary statistics or analytics for the purpose of: attributing actions to users; sending audible messages to users or managers; deriving and updating visual or printed reports; revising or tuning application configurations; and/or adjusting enterprise policy 340, or local observation platform policy 360, for how to improve the operation and response of the collaboration integration application.

Buy Online Pick Up in Store (BOPIS) Application

Figure 7C:
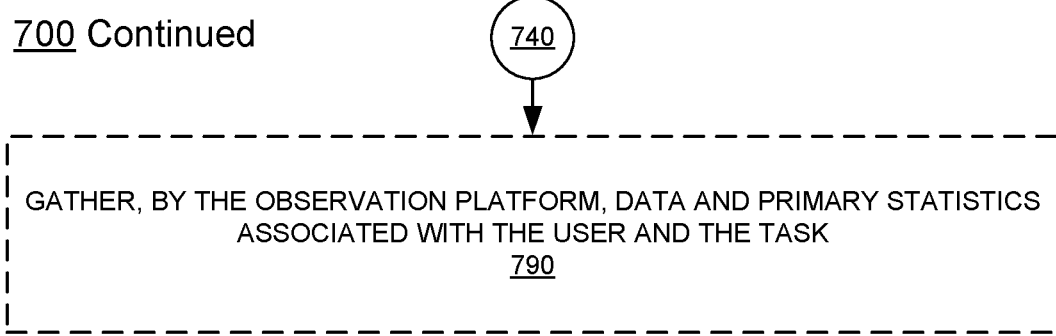

With reference now to FIGS. 7A-7C, flow diagram 700 illustrates an example method of observation platform buy-online-pickup-in-store integration, according to various embodiments. Although specific procedures are disclosed in flow diagram 700, such procedures are exemplary. That is, embodiments of the present invention are well suited to performing various other procedures or variations of the procedures recited in flow diagram 700. It is appreciated that the procedures in flow diagram 700 may be performed in an order different than presented, and that not all of the procedures in flow diagram 700 may be performed. In some embodiments, procedures of flow diagram 700 may be implemented by one or more processors of one or some combination of computer systems and/or may be stored in a non-transitory computer readable/useable store media (e.g., in a memory, memory device, disk, or the like).

At 710 of FIG. 7A, in one embodiment, a buy-online-pickup-in-store (BOPIS) application 201-11 is provisioned in at an observation platform. For example, the BOPIS application 201-11 may be provisioned onto a computer system 120-1 of the environment 100-1 of an observation platform. In some embodiments the provisioning is administered by a cloud services platform 220 in collaboration with a computer system 120 of the observation platform. The provisioning includes configuration and deployment of the BOPIS application 201-11 within the observation platform. As will be discussed, provisioning of the BOPIS application in the observation platform facilitates integration of the observation platform with an existing system used for BOPIS fulfillment by a retailer.

As part of the configuration and deployment of the BOPIS application 201-11 within an observation platform, an initial set of connected associates of a retailer is defined (e.g., an initial set of users 106 to be connected with BOPIS application 201-11 are selected and defined), the locations covered by the initial set of connected associates (i.e., the selected users 106) and the BOPIS application 201-11 are defined, and the application process steps for implementing the BOPIS application 201-11 are detailed. In one embodiment, the BOPIS application 201-11 is configured to address a set of connected associates (i.e., selected users 106) by one or more of name (first name, last name, and/or first name+ last name, employee number), role (manager, supervisor, facilities agent, security, fulfillment, etc.), group membership (leadership, hardware, frozen goods, BOPIS picking, BOPIS delivery, customer satisfaction), and/or geographic location. The connected associates are a selected group who will be facilitating BOPIS pickups and other BOPIS actions, which may be their exclusive jobs or may be in addition to other jobs or tasks they perform.

Additionally, the process steps are defined in a configuration set-up portal to include steps such as: an external computer system 328/160 identifies that an order is picked from the shelves/store of the retailer, assembled (i.e., in one place), and that the customer is on the way to a pick-up location; the external system notifies the observation platform the order is ready; the observation platform requests a single user commitment (i.e., a task request) from the set of connected associates (i.e., the selected users 106) to take responsibility for getting the order to the customer upon arrival of the customer; a single connected associate (e.g., user 106-1) accepts responsibility (e.g., by sending a task acceptance message to the BOPIS application 201-11 via voice or text interactive input to their device 105-1); the connected associate (e.g., user 106-1) is continuously updated with the arrival information of the customer; the connected associate (e.g., user 106-1) confirms (e.g., via voice or text interactive input to their device 105-1) that they are ready to service the customer; the order is delivered to the customer by the connected associate (e.g., user 106-1); any discrepancies are noted (e.g., via voice or text interactive input to their device 105-1) between the connected associate (e.g., user 106-1) and customer; the connected associate (e.g., user 106-1) closes the BOPIS event (e.g., via voice or text interactive input to their device 105-1); comments may be logged by the connected associate (e.g., user 106-1) or from the customer either directly or via an interface to the store computer 328/160. Data and statistics of all interactions are logged a computer system (e.g., computer 120-1). Cloud services configuration and control platform 220 may store a custom configuration 330, or may add procedures, delete procedures, or create new or different procedures in a configuration for a particular observation platform depending on the capabilities of the external systems and the capabilities of the API between the external system(s) and the computer system of the particular observation platform.

Inclusion of the BOPIS application 201-11 provides for services which enable efficient delivery of buy-online-pickup-in-store (BOPIS) activities. One of the keys to a successful BOPIS operation is to assure that employees accurately plan task activities, execute tasks as planned, and are directed in support of BOPIS by external computer 160/328 and data systems 150 which track BOPIS orders; and that information is gathered regarding how well the associates (i.e., users 106) are performing and how well the customer is satisfied.

Integrating the BOPIS application 201-11 with the store computer system improves speed and flexibility for managing the human activities of the BOPIS operation. By providing task and action information directly to one or more users of the observation platform, BOPIS activities and fulfillment processes can be designed more granularly. For example, using the efficiency of the BOPIS application within the observation platform enables the BOPIS store system 160/328 to juggle and switch task priorities based on logical and customer service priorities. Being in immediate contact with all employees using the system even allows re-tasking of non-BOPIS-dedicated employees to jump in for small orders or for peak load relief. In one case, customer service is improved if small orders or urgent orders are dispatched before larger orders that may already be in the queue. Having real-time information regarding the number of associates available for a task, the number of associates engaged in which kind of task, and instant information of task completion allows improved flexibility and decision making for the next action that might improve customer satisfaction or operational performance.

Data and primary statistics are gathered from each portion of the process of flow diagram 700 allowing analysis for measuring individual user performance, group performance of users, store/franchisee performance, chain/franchise-wide performance, and/or system performance. Additional data may be complied from the external store system computer 160/328 allowing the generation of overall and detailed performance metrics from the perspectives of customer service; staff-use efficiency, and process efficiency.

The BOPIS application 201-11 is used within an observation platform to notify employees that orders are ready for picking, that orders are picked and assembled for customer pick-up, that a customer is on the way to a pick-up location, and/or that the customer has arrived at the pick-up location. Additionally, the BOPIS application may identify and communicate the specific pick-up location, initiate the delivery of the products to the customer, record the time and place the products are delivered, and close the BOPIS task with optional comments or feedback.

At 720 of FIG. 7A, in one embodiment, automation software component for resident installation at an external collaboration application is sent from the observation platform (e.g., from the BOPIS application 201-11) to the external retailer system 328, where the external retailer system 328 is external to an environment 100 of the observation platform and, thus, may be referred to as an "external system application" or a "third-party system," or a "cloud-based system." Some examples include a BOPIS system used by a retailer for collecting Internet placed orders for customers and ensuring that stock exists to fulfill these orders at a designated retail location where the customer desires to pick up the items in Internet-placed order. The external retailer system may include a store computer for a retail store, and may include devices which are coupled with the store computer such as store video surveillance camera, store order kiosks, store intercoms, store push button communication terminals, etc. The automation software component is a separate function operating in the external retailer system 328, similar to a 'bot,' and may be or include an application program interface (API). The automation software component organizes and interfaces with information existing in the external retailer system 328 and allows the external retailer system 328 to exchange that information through a cloud-based gateway (e.g., gateway/interface 327) to the observation platform.

At 720 interfaces and APIs integrate the observation with the external system(s) 328, IoT devices, cameras, push buttons, kiosks or other systems or devices used by the retailer to deliver the BOPIS function. The linking of these external devices and systems creates the pathway for information between the committed associate (i.e., user 106-1), the external system(s) 328, and the customer. The automation software component may act as an API to form a bi-directional computer connection between the external system(s) 328 and the computer system 120/BOPIS application 201-11 of the observation platform. Information exchanged between the computer system 120/BOPIS application 201-11 and the external retailer system 328 includes triggers for each process procedure, feedback from users, feedback from the observation platform regarding task progress or completion, and information from the external systems in the form of text, triggers, or audible information.

At 730 of FIG. 7A, in one embodiment, a message regarding a BOPIS order populated in the external system 328 is received, at the BOPIS application 201-11 from the external retailer system 328. Messages passed between the external systems 328 and the computer system 120/BOPIS application 201-11 of the observation platform provide an indication of the BOPIS order status and any actions requested (e.g., task requests) of the connected associates (e.g., the selected users 106).

At 740 of FIG. 7A, in one embodiment, a task request is sent by the observation platform to a device of a user of the observation platform. The task request is a request to perform a task related to the message regarding the BOPIS order. The observation platform interprets information from the external retailer system(s) 328 and sends an action request/task request to one or more of the set of connected associates who were identified by the observation platform to perform specific tasks. In one example, a pick order is sent from the external retailer system 328 to the BOPIS application 201-11 of the observation platform and, in response, the observation platform determines sends a task request for picking item(s) of the order to one or more of the set of connected associates used to perform the pick function. In another case, the observation platform may receive an indication that a customer has arrived, or is soon to arrive, and that the order should be prepared for delivery. In that case, the observation platform sends a task request to one or more of the of the connected associates for delivery of a complete order to the customer.

Once the task request goes out to one or more of the set of connected associates, a response by the first associate to "accept" the task request indicates a commitment for follow through on the actions communicated in the task request. The task associated with the task request is then considered "accepted." For example, the system may announce that "a customer will arrive in two minutes" to the set of associates designated to fulfill order delivery. The first user in that set who responds with a "taking" action such as, "I've got it" or "Copy that" becomes the committed associate for that order. All further instructions, action requests, and responses for that order are no longer heard by full set of connected associates but are now exclusively heard by the committed associate only.

With reference to FIG. 7B, at 750, in one embodiment, a task acceptance message is received at the operating platform from the device to indicate acceptance of the task by the user. The user initiates the task acceptance message via interaction with the device, such as by pressing a button and speaking into the device or a microphone coupled with the device or by inputting text into the device.

At 760 of FIG. 7B, in one embodiment, in response to receipt of the task acceptance message, the observation platform suspends other task requests from being sent to the device of the user until a task completion message is received from the device to indicate completion of the task by the user. For example, a connected associate committed to a task request for picking item(s) in an order may be temporarily removed from the set of connected associates, so that they may concentrate on delivery and service without being interrupted by subsequent task requests or communications not related to the task request. Once the task is completed (e.g., reported as complete via device 105 or recognized as complete via other means), the removed connected associate automatically is restored into the set of connected associates so they may choose to respond to a subsequent task request.

At 770 of FIG. 7B, in one embodiment, the observation platform receives a task completion message from the device to indicate completion of the task by the user. The user initiates the task completion message via interaction with the device, such as by pressing a button and speaking into the device or a microphone coupled with the device or by inputting text into the device.

At 780 of FIG. 7B, in one embodiment, the BOPIS application of the observation platform reports, to the external retailer system 328, the completion of the task related to the BOPIS message.

As an example, and with reference to procedures 730-780, in one embodiment, an order may need to be picked from the store inventory and a message regarding the need for picking of the BOPIS order is received at BOPIS application 201-11 from external retailer system 328. In response, BOPIS application 201-1 sends a connected associate a task request (via the observation platform). The task request is a request for the connected associate to assist with picking the ordered items from store inventory and/or store shelves. Upon acceptance of the task request, the connected associate would be provided (on their device 105) with instructions for accessing the pick list, instructions for picking one or more items, or may receive the details of the pick list through the observation platform. As the items on the pick list are assembled, the connected associate may use an alternate application to indicate the item is picked and packaged or may use the observation platform directly to indicate the identification of each item (e.g., by voice or text interaction with their device 105) and whether or not that item is picked and packaged with the order. In some embodiments, the connected associate may be pointed to a separate application for picking and collecting the items on the order. In this example, the connected associate may report the order picking is complete to the observation platform (e.g., by voice or text interaction with their device 105) which then forwards the status to the external system 328 or may indicate completeness in the separate application that reports to the external computer system(s) 328. In some embodiments, the observation platform may block or suspend other task requests from being sent to the connected associate until a task completion message is received from the connected associate (via their device 105) to indicate that the task has been completed (i.e., the order has been picked or the assigned items in the order have been picked). Upon receipt of the task completion message, the BOPIS application 201-11 may report completion of the task to the external retailer system 328 (e.g., that the BOPIS order has been picked/assembled and is ready for delivery to the customer).

With continued reference to 730-780, in another embodiment, a fully picked/assembled order may need to be picked up from retail store by a customer and a message regarding the need for pickup of the BOPIS order is received at BOPIS application 201-11 from external retailer system 328. In response, BOPIS application 201-1 sends a connected associate a task request (via the observation platform). The task request is a request for the connected associate to assist with delivering the ordered items to the customer. Upon acceptance of the task request, the connected associate would be provided (on their device 105) with instructions for making contact with the customer to deliver the items of the BOPIS order. The information provided to the connected associate may additionally or alternatively include such information as: the order number, the customer's name, an estimated time of arrival (ETA) of the customer, how to identify the customer, the expected location of the customer (e.g., a delivery stall or location within the retailer's premises), and other information relevant to the order or its delivery. The observation platform may block or suspend other task requests from being sent to the connected associate until a task completion message is received from the connected associate (via their device 105) to indicate that the task has been completed (i.e., the order has been provided to the customer). Upon receipt of the task completion message, the BOPIS application 201-11 may report completion of the task to the external retailer system 328 (e.g., that the BOPIS order has been provided to the customer).

As can be seen from the descriptions and examples above, integrating the observation platform with the store computer running the BOPIS process allows the store to make near-real-time decisions regarding how the associates are assigned to tasks. Having the flexibility to adjust task priority quickly and with low effort improves customer satisfaction and reduces operational costs.

With reference to FIG. 7C, at 790, in one embodiment, the observation platform gathers data and primary statistics associated with the user and the task which was assigned to and accepted by the user. As with other applications deployed on the observation platform, data and primary statistics are collected from each portion of the activity described in FIGS. 7A and 7B. The data and primary statistics may include such information as: timestamps for start, end, and each portion of the process (e.g., when a task was offered, accepted, assigned, and/or reported as complete); user identities; device identities; location and motions for devices used; voice communication recording for analysis or forensics; text communication recording for analysis or forensics; system performance indicators such as speech quality, speech recognition effectiveness, signal strengths, ambient noise assessments, etc.

Depending on the sophistication and complexity of the external retailer system(s) 328 events such as status updates, progress reports, milestone markers, and task completion indications are signaled back to the external system either in real-time or post completion of a BOPIS order's picking and/or delivery to a customer. There is also an opportunity to survey the customer and/or the associate regarding the process and satisfaction once the task is shown as complete. The survey can use feedback entered directly into the observation platform system verbally (e.g., via a device 105) or via a feedback mechanism in user interface of the external retailer system 328.

Data Collection, Categorization and Generation of User Performance Metrics from Applications The observation platform collects data and primary statistics for all users and devices connected through the system or connected to the system. Examples of such data and primary statistics are shown in Table 1 and Table 2. Aggregation and manipulation of the primary statistics into secondary statistics and potentially into Higher-order statistics results in many categories of statistics that indicate the performance of an employee while in the environment of the observation platform.

Two broad categories of data are collected within the observation platform environment: objective data, and subjective data. Algorithms within the computer system attached to the observation platform then combine the data using policy and weighting factors provided by the enterprise or the defaulted to the observation platform system. The output of the algorithm becomes a component of the employee score that is either explicitly displayed or used internally for the computation of a Higher-order statistic that indicates a component of the employee performance score that is explicitly displayed.

In one embodiment, objective and subjective data may be combined to yield a performance score. For example, a manager may highly value time-in-zone, an objective primary statistic, with a weighting factor that is important to his business. The weighting factor is a subjective data element that is combined by the algorithm and policy within the observation platform which yields a performance score element for the user.

As one case, performance metrics can use location information as one Primary Statistic combined with other contextual information to produce secondary and higher-order statistics indicating the personal productivity metrics for the user.

In one embodiment, quantifying the percent of time a device or user spends in an assigned zone, the motion within that zone, the movement speed within the zone, the comparison of motion in the zone to outside of the zone or with other specified zones are combined to indicate performance factors such as energy, attentiveness and urgency. By measuring the relative time spent in other zones, the algorithm can determine the degree of task focus and attention to visitors or shoppers. By measuring the user communication patterns within and outside of the zone of interest, the algorithm can determine such performance factors as focus, helpfulness, inquisitiveness, depth of knowledge for the zone contents or function, and the willingness to follow instructions.

In one embodiment, counting the number of times a user (User A) requests the location of another user (User B) as a primary statistic, can be used to determine secondary or higher-order statistics that score how much a person is relied on in the enterprise and how often people want to find them (User B) or how well a manager is keeping up with situational awareness by checking the locations of employees (User A).

In one embodiment, counting the number of times a user (User A) requests "Who is near" a specific location to hear a list of employees and their status within that location, results in a primary statistic that can be used to determine secondary or higher-order statistics that score how much attention that user (User A) is paying to the situational awareness of the store or enterprise.

In one embodiment, combining verbal question-and-answer functions, with location data can be used by the algorithm to determine performance factors such as: product knowledge, team commitment, inquisitiveness, aptitude for products or functions within the zone, and team helpfulness.

The request and response function (which may be handled by request and response application 201-2) includes all cases where the system requests a response from a user, group of users or external devices; and then a response is expected and identified from one or more users or devices. The statistics can then be analyzed by the system to adjust the policy for the set of destinations alerted to subsequent requests for responses or to set expectations for the originator of the request on a subsequent action.

In one embodiment, performance metrics can be derived from request and response data as one primary statistic combined with other contextual information to produce secondary and higher-order statistics indicating the personal productivity metrics for the user.

In one embodiment, using and measuring request-and-response functions, with or without location data, as a primary statistic can be used to derive secondary and higher-order statistics that determine performance factors such as: response speeds, personal urgency, urgency to support others, team commitment, and personal energy levels. By comparing the request-and-response behaviors day-to-day, trends can be uncovered indicating employee motivation and employee reliability on a long-term or a daily basis.

In one embodiment, using and measuring request-and-response functions for expert groups, with or without location data, as a primary statistic can be used to derive secondary and higher-order statistics that determine if new employees are curious about products, services or processes and if existing employees are willing to share knowledge and their depth of knowledge by subject. The algorithm thus determines performance factors such as: employee inquisitiveness, depth of subject knowledge, willingness to share knowledge and speed of integration into the enterprise.

TABLE 3

Request and Response Examples

| Primary Function | Primary Statistics | Secondary and Higher-order Statistics (Performance Measurements) |
| --- | --- | --- |
| Expert Group — Asking Questions about Processes | Count of questions asked by user, times, locations where asked, locations where answered, time to answer, length of answer, number of users listening to answer, number of users NOT listening to answer, keywords in question, keywords in answer, number of questions not listened to, requests heard and NOT responded to. | Inquisitiveness, assimilation status and rate, knowledge topics, depth of process knowledge, willingness to share knowledge, consistency of actions |
| Expert Group — Asking Questions about Products | Count of questions asked by user, times, locations where asked, locations where answered, time to answer, length of answer, number of users listening to answer, number of users NOT listening to answer, keywords in question, keywords in answer, number of questions not listened to, requests heard and NOT responded to. | Inquisitiveness, assimilation status and rate, knowledge topics, depth of product knowledge, willingness to share knowledge, consistency of actions |
| Zone-coverage alerts — Receiving alerts that a zone is not staffed or is overstaffed | Measure reaction time to respond to the request, number of requests responded to, time to arrive at the coverage location, locations where time spent, speed traveled, path traversed, requests heard and NOT responded to. | Team support, customer affinity, understanding of role, job urgency, environmental awareness. |

TABLE 3-continued

Request and Response Examples

| Primary Function | Primary Statistics | Secondary and Higher-order Statistics (Performance Measurements) |
|---|---|---|
| Kiosk alerts — Receiving alerts that a visitor is engaged with a kiosk and may need attention | Measure reaction time to respond to the request, time to arrive at the correct location, speed traveled, path traversed, speed to arrive in proximity of visitor or shopper, length of time spent in location or in the proximity of the visitor, visitor feedback from external devices or systems used by visitors or customers, customer feedback rating from another user of the system, requests heard and NOT responded to, relationship of user role to the kiosk function. | Urgency to support shoppers or visitors, helpfulness, depth of knowledge regarding kiosk products or information presented, awareness of priorities, customer satisfaction scores. |
| "Soft button" alerts — receiving alerts that a visitor has pressed a button or has verbally requested help or information and they are expecting some action | Measure reaction time to respond to the request, time to arrive at the correct location, speed traveled, path traversed, speed to arrive in proximity of visitor or shopper, length of time spent in location or in the proximity of the visitor, visitor feedback from external devices or systems used by visitors or customers, customer feedback rating from another user of the system, requests heard and NOT responded to, relationship of user role to the kiosk function. | Urgency to support shoppers or visitors, helpfulness, depth of knowledge regarding button location products, awareness of priorities, customer satisfaction scores |
| Buy-on-line, fulfill-in-store requests — alerts or task requests from omni-channel sources that inventory needs to be verified or held | Measure reaction time to respond to the request, current task, time to arrive at the inventory location, speed traveled, path traversed, speed to verify inventory, speed to move inventory to holding location, voice inflections | Urgency in inventory verification, inventory location knowledge, desire to assist, team cooperation, task switching speed, and process support |
| Pick-up requests — requests for products to be delivered to specific locations | Measure reaction time to respond to the request, current task, time to arrive at the inventory location, speed traveled, path traversed, speed to verify inventory, locations visited, voice inflections, visitor feedback from external devices or systems used by visitors or customers | Urgency to support shoppers or visitors, helpfulness, desire to assist, customer satisfaction scores. |
| Inventory verification requests — requests from systems or other stores to validate inventory status | Measure reaction time to respond to the request, time to arrive at the inventory location, speed traveled, path traversed, speed to verify inventory, locations visited, voice inflections, speech cadence | Urgency in inventory verification, inventory location knowledge, desire to assist, team cooperation and support |
| Responding to location-based tasks — tasks that are heard when a user moves into a specific zone | Measure times through zone with and without action, speed through zone, adjacency to visitors or shoppers while passing through zone, time to close task after entering zone, voice inflections, speech cadence, subject feedback on quality and completeness of task within zone, task requests heard and NOT responded to. | Task orientation, willingness to take on new tasks, task efficiency, quality of workmanship, affinity to types of tasks |

In one embodiment, combining point of sale (POS) information, with location data can be used by the algorithm to determine performance factors such as: selling effectiveness within assigned zone, selling effectiveness in other zones, attention to basket size, conversion rate scores, attention to product margins.

In one embodiment, combining shopper or visitor feedback information gathered by shopper or visitor applications that are able to detect the observation platform user, with location data can be used by the algorithm to determine performance factors such as: customer satisfaction scores by zone covered, customer satisfaction vs. time spent with the customer, and other performance metrics as derived from survey tool applications used by the shopper or visitor In a different case, performance metrics can use external system instructions as one or more primary statistic(s) combined with other contextual information to produce secondary and higher-order statistics indicating the personal productivity metrics for the user.

In one embodiment, combining shopper or visitor encounter information gathered by detecting shopper or visitor applications using BLE, Bluetooth, Cellular or WiFi signal detection, with external system instructions can be used by the algorithm to determine performance factors such as: social interaction scores, helpfulness scores, shopper or visitor attentiveness scores, and urgency to assist scores.

In one embodiment, combining task requests originating from external system instructions with other context information can be used by the algorithm to determine performance factors such as: reaction time to pick up assigned or requested tasks, reaction time to verify on-shelf or backroom inventory, task compliance performance, task urgency compliance, and competitiveness scores.

In one embodiment, combining time-clock information from external systems with user behavior within the observation platform environment can be used by the algorithm to determine performance factors such as: ability to plan actions, ability to complete tasks in a timely manner, ability to complete tasks within daily deadlines, and ability to keep to schedules.

In one embodiment, combining video camera information from external systems with user behavior within the observation platform environment can be used by the algorithm to determine performance factors such as: ability to address customers or visitors appropriately, ability to recognize poor coverage zones or assist groups of customers or visitors, urgency to address loss prevention alerts, ability to assist and support diverse cultures of customers or visitors.

In a different set of cases, performance metrics can use information manually entered into either the observation platform or an external system as one Primary Statistic combined with other contextual information to produce Secondary and Higher-order statistics indicating the personal productivity metrics for the user. Manual entry can be via a smart device, tablet, computer screen, pushbutton, touch screen, or verbally using speech recognition.

In one embodiment, combining external, manually entered information with user behavior and context within the observation platform environment can be used by the algorithm to determine performance factors such as: absorption and application of course work completed, absorption and application of video, audio or other training methodologies, absorption and application of brand-oriented messages and information provided by the enterprise, and correlation of course grades to the application of the material in the observation environment.

In one embodiment, combining external, manually entered information from customers or visitors that is requested via an application running on a device carried by the customer or visitor, with user behavior and context within the observation platform environment can be used by the algorithm to determine performance factors such as: customer satisfaction scores, ability to pay attention and focus, ability to answer questions, demeanor, helpfulness, alertness, depth of knowledge, and breadth of knowledge.

In one embodiment, combining external, manually entered information from other users of the system or peers, which is requested via an application running on a device carried by the user or from a terminal connected to the observation platform, with user behavior and user context within the observation platform environment can be used by the algorithm to determine performance factors such as: team player scores, helpfulness scores, knowledge sharing scores, customer satisfaction scores, demeanor toward co-workers, alertness, depth of knowledge, and breadth of knowledge.

In one embodiment, combining external, manually entered information from other users of the system or peers, which is requested via a scheduled process or adjusted by enterprise policy controlling the scheduled process within the observation platform, with user behavior and user context within the observation platform environment can be used by the algorithm to determine performance factors such as: progress toward goals, team player scores, helpfulness scores, knowledge sharing scores, customer satisfaction scores, demeanor toward co-workers, alertness, depth of knowledge, and breadth of knowledge.

In one embodiment, combining external, manually entered information from the primary user with that same user's behavioral data and context within the observation platform environment can be used by the algorithm to determine performance factors such as: progress toward goals, new potential goals, attitude towards tasks, goals, career, and company; team player scores; demeanor toward co-workers or managers; desire for improvement; and willingness to accept feedback. Additionally, users can offer commentary, explanations, or rebuttals to the objective performance scores in the system.

In one embodiment, combining external, manually and automatically entered information regarding length of employment and past roles and responsibilities can be used by the algorithm to determine performance factors such as: progress toward goals, new potential goals, attitude towards tasks, goals, career and company; team player scores; demeanor toward co-workers or managers; desire for improvement; willingness to accept feedback; and other career determining or limiting factors.

In one embodiment, combining information from point-of-sale (POS) systems with the primary and secondary statistics of the user, especially proximity information gathered by beacons or BLE connections, can be used by the algorithm to determine performance factors such as: sales effectivity/efficiency (e.g., sales dollars per minute spent with shoppers), ability to upsell and influence add-on purchases, ability to move the shopper to different departments and increase basket size, ability to create conversions (sales) with shorter customer encounters.

Example algorithms for producing quantified performance measurements and metrics are shown in Table 4. These algorithms represent one of many possible calculations for each performance metric. The algorithm examples use the coefficient "C" as a normalizing and weighting factor for each performance category. The other capital letter coefficients are used within the algorithm to weight each performance factor. All of these coefficients many be adjusted based on the business requirements of each environment.

TABLE 4

Example Algorithms for Producing Quantified Performance Measurements and Metrics

| Primary Function | Typical Algorithm Shown as an Example | Result |
| --- | --- | --- |
| Expert Group — Asking Questions about Processes [Process questions are identified by either a specific command or a recognized set of keywords] | Inquisitiveness: C[+M(number of questions asked/user-hr) + N(number of questions listened to/user-hr) + P(time spent listening to answers/user-hr) – Q(number of questions NOT listened to/user-hr)] <br> Assimilation Status: C'[+M(number of questions asked/user-hr) + N(number of questions listened to/user-hr) + A(the number of questions answered/user-hr) – T(average response time to answer a question) – Q(number of questions NOT answered/user-hr)] <br> Assimilation Rate: (the linear slope of the above equation computed over an interval of time) <br> Depth of Process Knowledge: C"[–M(number of questions asked/user-hr) + A(the number of questions answered/user-hr) + W(the number of users who listen to the full answer) – X(the number of users who do NOT listen to full answer) – T(average response time to answer a question) – Q(number of questions NOT answered/user-hr)] <br> Willingness to Share Knowledge: C'''[+A(the percentage of questions answered) – T(average response time to answer a question) – Q(number of questions NOT answered/user-hr) <br> Consistency of Actions: Consistency is computed as the standard deviation (or other statistical model) for the set of characteristics defined above. | A numerical value normalized in the range of typically 0-100 (by the constant value of C) indicating the performance of the user for the category. For "Knowledge Topics" the result is list of keyword topics in ranked order of frequency of responding. |

TABLE 4-continued

Example Algorithms for Producing Quantified Performance Measurements and Metrics

| Primary Function | Typical Algorithm Shown as an Example | Result |
| --- | --- | --- |
| Expert Group — Asking Questions about Products Product questions are identified by either a specific command or a recognized set of keywords] | Knowledge Topics: [keyword]*C'''[M(number of questions asked/user-hr) + N(number of questions listened to/user-hr) + A(the number of questions answered/user-hr) − T(average response time to answer a question) − Q(number of questions NOT answered/user-hr)] Inquisitiveness: C[+M(number of questions asked/user-hr) + N(number of questions listened to/user-hr) + P(time spent listening to answers/user-hr) − Q(number of questions NOT listened to/user-hr)] Assimilation Status: C'[+M(number of questions asked/user-hr) + N(number of questions listened to/user-hr) + A(the number of questions answered/ user-hr) − T(average response time to answer a question) − Q(number of questions NOT answered/user-hr)] Assimilation Rate: (the linear slope of the above equation computed over an interval of time) Depth of Process Knowledge: C'''[−M(number of questions asked/user-hr) + N(number of questions listened to/user-hr) + A(the number of questions answered/user-hr) + W(the number of users who listen to the full answer) − X(the number of users who do NOT listen to full answer) − T(average response time to answer a question) − Q(number of questions NOT answered/user-hr) Willingness to Share Knowledge: C'''[+A(the percentage of questions answered) − T (average response time to answer a question) − Q(number of questions NOT answered/user-hr) Consistency of Actions: Consistency is computed as the standard deviation (or other statistical model) for the set of characteristics defined above. Knowledge Topics: [keyword]*C'''[M(number of questions asked/user-hr) + N(number of questions listened to/user-hr) + A(the number of questions answered/user-hr) − T(average response time to answer a question) − Q(number of questions NOT answered/user-hr)] | A numerical value normalized in the range of typically 0-100 (by the constant value of C) indicating the performance of the user for the category. For "Knowledge Topics" the result is list of keyword topics in ranked order of frequency of responding. |
| Zone-coverage alerts — Receiving alerts that a zone is not staffed or is overstaffed | Team Support: C[T(average proximity to other users) + R(reaction time to respond to a request) − S(average time to arrive at the coverage location) + L(speed traveled) + N(number of requests responded to/user-hr) − Q(number of requests NOT responded to/user-hr)] Customer Affinity: C'[+R(reaction time to respond to a request) − S(average time to arrive at the coverage location) + L(speed traveled) + N(number of requests responded to/user-hr) − Q(number of requests NOT responded to/user-hr) Understanding of Role: C''[A(time spent in target location) + R(reaction time to respond to a request) − S(average time to arrive at the coverage location) + L(speed traveled) + N(number of requests responded to/user-hr) − Q(number of requests NOT respondedto/user-hr) Job Urgency: C''[A(time spent in target location) + R(reaction time to respond to a request) − S(average time to arrive at the coverage location) + L(speed traveled)] Environmental Awareness: C''[A(time spent in target location) + B(number of other locations visited/user-hr) − C(number of locations not visited/user-hr) − P(the path length traveled vs. the average path length for all users between the starting point and the ending point)] | A numerical value normalized in the range of typically 0-100 (by the constant value of C) indicating the performance of the user for the category. |

TABLE 4-continued

Example Algorithms for Producing Quantified Performance Measurements and Metrics

| Primary Function | Typical Algorithm Shown as an Example | Result |
| --- | --- | --- |
| Kiosk alerts — Receiving alerts that a visitor is engaged with a kiosk and may need attention | Urgency to Support Visitors: C[+R(reaction time to respond to a kiosk request) − S(average time to arrive at the coverage location) + L(speed traveled) + N(number of requests responded to/user-hr) − Q(number of requests NOT responded to/user-hr)]<br>Helpfulness: C'[+R(reaction time to respond to a kiosk request) − S(average time to arrive at the coverage location) + L(speed traveled) + N(number of requests responded to/user-hr) − Q(number of requests NOT responded to)] + T(time spent at the kiosk location) + V(time spent in the proximity of the visitor)<br>Depth of Knowledge Regarding Kiosk Products: C"[+R(reaction time to respond to a kiosk request) + A(the number of questions with relevant keywords answered/user-hr) + W(the number of users who listen to the full answer) − X(the number of users who do NOT listen to full answer) − T(average response time to answer a question with relevant keywords) − Q(number of questions NOT answered/user-hr) with relevant keywords]<br>Awareness of Priorities: C'"[+R(reaction time to respond to a kiosk request) − S(average time to arrive at the coverage location) + L(speed traveled) + N(number of requests responded to/user-hr) − Q(number of requests NOT responded to)] + E(relationship of role to kiosk function)]<br>Customer Satisfaction Scores: C""[+R(reaction time to respond to a kiosk request) − S(average time to arrive at the coverage location) + L(speed traveled) + N(number of requests responded to/user-hr) − Q(number of requests NOT responded to)] + F(customer feedback scores collected from kiosk or applications related to kiosk) + G(customer feedback rating from another user of the system)] | A numerical value normalized in the range of typically 0-100 (by the constant value of C) indicating the performance of the user for the category. |
| "Soft button" alerts — receiving alerts that a visitor has pressed a button and expecting some action | Urgency to Support Visitors: C[+R(reaction time to respond to a kiosk request) − S(average time to arrive at the coverage location) + L(speed traveled) + N(number of requests responded to/user-hr) − Q(number of requests NOT responded to/user-hr)]<br>Helpfulness: C'[+R(reaction time to respond to a kiosk request) − S(average time to arrive at the coverage location) + L(speed traveled) + N(number of requests responded to/user-hr) − Q(number of requests NOT responded to/user-hr)] + T(time spent in the proximity of the soft button location) + V(time spent in the proximity of the visitor)]<br>Depth of Knowledge Regarding Kiosk Products: C"[+R(reaction time to respond to a soft button request) + A(the numberof questions with relevant keywords answered/user-hr) + W (the number of users who listen to the full answer) − X(the number of users who do NOT listen to full answer) − T(average response time to answer a question with relevant keywords) − Q(number of questions NOT answered/user-hr) with relevant keywords]<br>Awareness of Priorities: C'"[+R(reaction time to respond to a kiosk request) − S(average time to arrive at the coverage location) + L(speed traveled) + N(number of requests responded to/user-hr) − Q(number of requests NOT responded to)] + E(relationship of role to soft button request type)]<br>Customer Satisfaction Scores: C""[+R(reaction time to respond to a kiosk request) − S(average time to arrive within proximity of the soft button) + L(speed | A numerical value normalized in the range of typically 0-100 (by the constant value of C) indicating the performance of the user for the category. |

TABLE 4-continued

Example Algorithms for Producing Quantified Performance Measurements and Metrics

| Primary Function | Typical Algorithm Shown as an Example | Result |
|---|---|---|
| | traveled) + N(number of requests responded to/user-hr) − Q(number of requests NOT responded to) [+F(customer feedback scores collected from soft button or applications related to soft button) + G(customer feedback rating from another user of the system)] + V (positive voice inflection scores for communications over the past T user-hrs) | |
| Buy-on-line, pick-up-in-store (BOPIS) requests — alerts or task requests from omni-channel sources that inventory needs to be verified or held | Urgency in Inventory Verification: C[+R(reaction time to respond to a BOPIS request) − S(average time to arrive at the inventory location) + L(speed traveled) + N(number of BOPIS requests responded to/user-hr) − Q(number of BOPIS requests NOT responded to/user-hr)] Inventory Location Knowledge: C'[+R(reaction time to respond to a BOPIS request) − S(average time to arrive at the inventory location) + L(speed traveled) −P(the path length traveled vs. the average path length for all users between the starting point and the ending point)] Desire to Assist: C"[+R(reaction time to respond to a BOP IS request) − S(average time to arrive at the product location) + L(speed traveled) + N(number of requests responded to/user-hr) − Q(number of requests NOT responded to/user-hr)] + E(relationship of role to BOPIS request type) Team Cooperation: C"[+R(reaction time to respond to a BOP IS request) − S(averagetime to arrive at the product location) + L(speed traveled) + N(number of requests responded to/user-hr) − Q(number of requests NOT responded to/user-hr)]+ V(positive voice inflection scores for communications over the past T user-hrs) | A numerical value normalized in the range of typically 0-100 (by the constant value of C) indicating the performance of the user for the category. |
| Pick-up or Carry Out alerts — task requests for products to be delivered to specific locations | Urgency to Support Visitors: C[+R(reaction time to respond to a request) − S(average time to arrive at the required location) + L(speed traveled) + N(number of requests responded to/user-hr) − Q(number of requests NOT responded to/user-hr)] Helpfulness: C'[+R(reaction time to respond to a request) − S(average time to arrive at the required location) + L(speed traveled) + N(number of requests responded to/user-hr) − Q(number of requests NOT responded to/user-hr)] + T(time spent from arriving at the required location to indicating the task is complete) + V(time spent in the proximity of the visitor)] Desire to Assist: C"[ R(reaction time to respond to a request) − S(average time to arrive at the required location) + L(speed traveled) + N(number of requests responded to/user-hr) − Q(number of requests NOT responded to/user-hr)] + E(relationship of role to Pick-up or Carry Out request type)] Customer Satisfaction Scores: C"[+R(reaction time to respond to a request) − S (average time to arrive within proximity of the request) +L (speed traveled) + N(number of requests responded to/user-hr) − Q(number of requests NOT responded to/user-hr)] + F (customer feedback scores collected from an application running in a visitor device) + G(customer feedback rating from another user of the system)] + V(positive voice inflection scores for communications over the past T user-hrs) | A numerical value normalized in the range of typically 0-100 (by the constant value of C) indicating the performance of the user for the category. |

TABLE 4-continued

Example Algorithms for Producing Quantified Performance Measurements and Metrics

| Primary Function | Typical Algorithm Shown as an Example | Result |
| --- | --- | --- |
| Inventory verification requests — task requests from systems or other stores to validate inventory status | Urgency in Inventory Verification: C'[+R(reaction time to respond to a verification request) − S(average time to arrive at the inventory location) +L (speed traveled) + N(number of verification requests responded to/user-hr) − Q(number of verification requests NOT responded to/user-hr)] Inventory Location Knowledge: C'[+R(reaction time to respond to a verification request) − S(average time to arrive at the inventory location) + L(speed traveled) − P(the path length traveled vs. the average path length for all users between the starting point and the ending point)] Desire to Assist: C"[+R(reaction time to respond to a verification request) − S(average time to arrive at the required location) + L(speed traveled) + N(number of verification requests responded to/user-hr) − Q(number of verification requests NOT responded to/user-hr)] + E (relationship of role to inventory verification request type)] Team Cooperation: C"[+R(reaction time to respond to an inventory verification request) − S (average time to arrive at the product location) + L(speed traveled) + N(number of inventory verification requests responded to/user-hr) − Q(number of inventory verification request NOT responded to/user-hr)] + V(positive voice inflection scores for communications over the past T user-hrs) | A numerical value normalized in the range of 0-100 (by the constant value of C) indicating the performance of the user for the category. |
| Responding to location based tasks — task requests that are heard when a user moves into a specific zone | Task Orientation: C[+D((number of location-tasks accepted/user-hr)/(number of location-tasks heard/user-hr)) − T(time to indicate task completion) Willingness to Take on New Tasks: C'[+D((number of location-tasks accepted/user-hr)/(number of location-tasks heard/user-hr)) + N(number of different locations for accepted tasks) − M(number of different locations for tasks NOT accepted) Task Efficiency: C"[+D((number of location-tasks accepted/user-hr)/(number of location-tasks heard/user-hr)) − H(time from task acceptance to task complete)] Quality of Workmanship: C"[+D((number of location-tasks accepted/user-hr) − H (time from task acceptance to task complete) + B(external rating of workmanship from other users or managers)] Affinity to Types of Tasks: C"[+D((number of location-tasks accepted/user-hr for each location)] | A numerical value normalized in the range of typically 0-100 (by the constant value of C) indicating the performance of the user for the category. For "Affinity to Types of Tasks "the result is list of task locations in ranked order of frequency of acceptance in a given location. |

Example Computer System Environment for the Observation Platform

Portions of the present technology are composed of computer-readable and computer-executable instructions that reside, for example, in computer-usable/readable media of a computer system or other user device. Described below is an example computer system or components that may be used for or in conjunction with aspects of the present technology. The computer system described by represent one or more components of a computer system 120 of an environment 100 of an observation platform, or some other computer used with the technology described herein.

It is appreciated that that the present technology can operate on or within a number of different computer systems including general purpose networked computer systems, embedded computer systems, cloud-based computers, routers, switches, server devices, user devices, various intermediate devices/artifacts, stand-alone computer systems, mobile phones, personal data assistants, televisions and the like. The computer system is well adapted to having peripheral computer useable/readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g., random access memory (RAM), coupled to bus for storing information and instructions for processor(s).

The computer system may also include computer usable non-volatile memory, e.g., read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g., via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of observation platform buy-online-pickup-in-store integration, the method comprising:
   provisioning, at an observation platform, a buy-online-pickup-in-store (BOPIS) application, wherein the provisioning is administered by a cloud services platform in collaboration with a computer system of the observation platform, and wherein the provisioning includes configuration and deployment of the BOPIS application within the observation platform;
   sending, from the BOPIS application on the observation platform, an automation software component for resident installation at an external retailer system, wherein the external retailer system is external to an environment of the observation platform, and wherein the automation software component organizes information in the external retailer system for exchange, via a cloud-based gateway, with the BOPIS application;
   receiving, at the BOPIS application from the external retailer system, a message regarding a BOPIS order populated in the external retailer system; and
   sending, by the observation platform, to a device of a user of the observation platform a task request to perform a task related to the message regarding the BOPIS order.

2. The method as recited in claim 1, further comprising:
   receiving, at the observation platform, a task acceptance message from the device to indicate acceptance of the task by the user, wherein the user initiates the task acceptance message via interaction with the device.

3. The method as recited in claim 2, further comprising:
   responsive to receipt of the task acceptance message, suspending, by the observation platform, other task requests from being sent to the device of the user until a task completion message is received from the device to indicate completion of the task by the user.

4. The method as recited in claim 2, further comprising:
   receiving, at the observation platform, a task completion message from the device to indicate completion of the task by the user, wherein the user initiates the task completion message via interaction with the device.

5. The method as recited in claim 4, further comprising:
   reporting to the external retailer system, via the BOPIS application of the observation platform, completion of the task related to the message regarding the BOPIS order.

6. The method as recited in claim 1, further comprising:
   gathering, by the observation platform, data and primary statistics associated with the user and the task.

7. A non-transitory computer-usable storage medium having instructions embodied therein that, when executed, cause a computer system to perform method of observation platform buy-online-pickup-in-store integration, the method comprising:
   provisioning, at an observation platform, a buy-online-pickup-in-store (BOPIS) application, wherein the provisioning is administered by a cloud services platform in collaboration with a computer system of the observation platform, and wherein the provisioning includes configuration and deployment of the BOPIS application within the observation platform;
   sending, from the BOPIS application on the observation platform, an automation software component for resident installation at an external retailer system, wherein the external retailer system is external to an environment of the observation platform, and wherein the automation software component organizes information in the external retailer system for exchange, via a cloud-based gateway, with the BOPIS application;
   receiving, at the BOPIS application from the external retailer system, a message regarding a BOPIS order populated in the external retailer system; and
   sending, by the observation platform, a device of a user of the observation platform a task request to perform a task related to the message regarding the BOPIS order.

8. The non-transitory computer-usable storage medium of claim 1, wherein the method further comprises:
   receiving, at the observation platform, a task acceptance message from the device to indicate acceptance of the task by the user, wherein the user initiates the task acceptance message via interaction with the device.

9. The non-transitory computer-usable storage medium of claim 2, wherein the method further comprises:
   responsive to receipt of the task acceptance message, suspending, by the observation platform, other task requests from being sent to the device of the user until a task completion message is received from the device to indicate completion of the task by the user.

10. The non-transitory computer-usable storage medium of claim 2, wherein the method further comprises:
    receiving, at the observation platform a task completion message from the device to indicate completion of the task by the user, wherein the user initiates the task completion message via interaction with the device.

11. The non-transitory computer-usable storage medium of claim 1, wherein the method further comprises:
    reporting to the external retailer system, via the BOPIS application of the observation platform, completion of the task related to the message regarding the BOPIS order.

12. The non-transitory computer-usable storage medium of claim 1, wherein the method further comprises:

gathering, by the observation platform, data and primary statistics associated with the user and the task.

13. An observation platform comprising:
a computer system;
a first communication device associated with a first user;
a second communication device associated with and communicatively coupled with the computer system; and
a plurality of additional communication devices, where each of the plurality of additional communication devices is associated with a different user of a plurality of additional users; and
wherein the computer system is configured to communicate with the first communication device and the plurality of additional communication devices via the second communication device and is further configured to:
provision, at the observation platform, a buy-online-pickup-in-store (BOPIS) application, wherein the provisioning is administered by a cloud services platform in collaboration with the computer system, and wherein the provisioning includes configuration and deployment of the BOPIS application within the observation platform;
send, from the BOPIS application on the observation platform, an automation software component for resident installation at an external retailer system, wherein the external retailer system is external to an environment of the observation platform, and wherein the automation software component organizes information in the external retailer system for exchange, via a cloud-based gateway, with the BOPIS application;
receive, at the BOPIS application from the external retailer system, a message regarding a BOPIS order populated in the external retailer system; and
send the first communication device a task request for the first user to perform a task related to the message regarding the BOPIS order.

14. The observation platform of claim 13, wherein the computer system is further configured to:
receive a task acceptance message from the first communication device to indicate acceptance of the task by the first user, wherein the first user initiates the task acceptance message via interaction with the first communication device.

15. The observation platform of claim 14, wherein the computer system is further configured to:
responsive to receipt of the task acceptance message, suspend other task requests from being sent by the observation platform to the first communication device until a task completion message is received from the first communication device to indicate completion of the task by the first user.

16. The observation platform of claim 14, wherein the computer system is further configured to:
receive a task completion message from the first communication device to indicate completion of the task by the first user, wherein the first user initiates the task completion message via interaction with the first communication device.

17. The observation platform of claim 14, wherein the computer system is further configured to:
report to the external retailer system, via the BOPIS application, completion of the task related to the message regarding the BOPIS order.

18. The observation platform of claim 14, wherein the computer system is further configured to:
gather data and primary statistics associated with the first user and the task.

19. The observation platform of claim 18, wherein the gathered data and primary statistics are from the group of data and primary statistics consisting of: a task name; a task status; a timestamp for when a task was offered; a timestamp for when a task was assigned; a timestamp for when a task was accepted; a timestamp for when a task was updated; a timestamp for when a task was completed; location information of one or more users; and an interaction between users of the observation platform.

20. A system comprising:
an observation platform remote from and communicatively coupled with a cloud services platform, the observation platform comprising:
a computer system;
a first communication device associated with a first user;
a second communication device associated with and communicatively coupled with the computer system; and
a plurality of additional communication devices, where each of the plurality of additional communication devices is associated with a different user of a plurality of additional users; and
a cloud services platform comprising:
a functional application suite which includes a plurality of remotely provisionable applications, wherein a buy-online-pickup-in-store (BOPIS) application is one of the plurality of remotely provisionable applications; and
an external systems interface configured to couple the observation platform via the cloud services platform with one or more systems external to the observation platform;
wherein the cloud services platform is configured to provision, at the observation platform, the application, wherein the provisioning includes configuration and deployment of the BOPIS application within the observation platform; and
wherein the computer system is configured to communicate with the first communication device and the plurality of additional communication devices via the second communication device and is further configured to:
send, from the BOPIS application on the observation platform, an automation software component for resident installation at an external retailer system, wherein the external retailer system is external to an environment of the observation platform, and wherein the automation software component organizes information in the external retailer system for exchange, via a cloud-based gateway, with the BOPIS application;
receive, at the BOPIS application from the external retailer system, a message regarding a BOPIS order populated in the external retailer system; and
send the first communication device a task request for the first user to perform a task related to the message regarding the BOPIS order.

* * * * *